(12) United States Patent
Okada et al.

(10) Patent No.: US 9,186,938 B2
(45) Date of Patent: Nov. 17, 2015

(54) WHEEL POSITION DETECTOR AND TIRE INFLATION PRESSURE DETECTOR HAVING THE SAME

(71) Applicant: DENSO CORPORATION, Kariya, Aichi-pref. (JP)

(72) Inventors: Noriaki Okada, Chiryu (JP); Nobuya Watabe, Nagoya (JP); Masashi Mori, Obu (JP); Takatoshi Sekizawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/371,304

(22) PCT Filed: Jan. 15, 2013

(86) PCT No.: PCT/JP2013/000119
§ 371 (c)(1),
(2) Date: Jul. 9, 2014

(87) PCT Pub. No.: WO2013/108609
PCT Pub. Date: Jul. 25, 2013

(65) Prior Publication Data
US 2015/0183279 A1 Jul. 2, 2015

(30) Foreign Application Priority Data
Jan. 18, 2012 (JP) .................. 2012-008238

(51) Int. Cl.
*G06F 17/00* (2006.01)
*B60C 23/04* (2006.01)

(52) U.S. Cl.
CPC ......... *B60C 23/0408* (2013.01); *B60C 23/0415* (2013.01); *B60C 23/0416* (2013.01); *B60C 23/0488* (2013.01); *B60C 23/0489* (2013.01)

(58) Field of Classification Search
CPC ........... B60C 23/0408; B60C 23/0415; B60C 23/0416; B60C 23/0488; B60C 23/0489
USPC .................................. 235/375, 492
See application file for complete search history.

(56) References Cited

U.S. PATENT DOCUMENTS

| | | | |
|---|---|---|---|
| 5,602,524 A * | 2/1997 | Mock et al. | 340/447 |
| 6,018,993 A * | 2/2000 | Normann et al. | 73/146.5 |

(Continued)

FOREIGN PATENT DOCUMENTS

| | | |
|---|---|---|
| DE | 102009059788 A1 | 6/2011 |
| FR | 2949382 A1 | 3/2011 |

(Continued)

OTHER PUBLICATIONS

U.S. Appl. No. 14/368,384, Mori, filed Jun. 24, 2014.

(Continued)

*Primary Examiner* — Paultep Savusdiphol
(74) *Attorney, Agent, or Firm* — Harness, Dickey & Pierce, P.L.C.

(57) ABSTRACT

In a wheel position detector for a vehicle, a transmitter on each wheel repeatedly transmits a data frame containing identification information when an angle of the transmitter reaches a transmission angle. A receiver for receiving the frame is mounted on a body of a vehicle and performs wheel position detection based on the frame to specify a target wheel from which the frame is transmitted. The receiver acquires a tooth position of a gear rotating with a corresponding wheel when receiving the frame and sets a variation allowable range based on the tooth position. The receiver specifies the target wheel by determining whether the tooth position falls within the variation allowable range a predetermined number of times in a row.

8 Claims, 16 Drawing Sheets

(56) References Cited

U.S. PATENT DOCUMENTS

| | | | |
|---|---|---|---|
| 6,489,888 B1* | 12/2002 | Honeck et al. | 340/442 |
| 6,922,140 B2* | 7/2005 | Hernando et al. | 340/444 |
| 7,010,968 B2* | 3/2006 | Stewart et al. | 73/146 |
| 7,336,161 B2* | 2/2008 | Walraet | 340/442 |
| 7,490,793 B2* | 2/2009 | Mackness | 244/100 R |
| 7,515,040 B2* | 4/2009 | Mori et al. | 340/442 |
| 2011/0071737 A1* | 3/2011 | Greer et al. | 701/49 |
| 2012/0259507 A1* | 10/2012 | Fink | 701/32.7 |
| 2014/0340213 A1 | 11/2014 | Okada et al. | |

FOREIGN PATENT DOCUMENTS

| | | | |
|---|---|---|---|
| JP | H10048233 A | 2/1998 | |
| JP | 3212311 B2 | 9/2001 | |
| JP | 2007015491 A | 1/2007 | |
| JP | 2010122023 A | 6/2010 | |

OTHER PUBLICATIONS

International Search Report and Written Opinion for PCT/JP2013/000119, mailed Apr. 10, 2013; ISA/EP.

Office Action dated Jun. 29, 2015 in corresponding Korean Application No. 10-2014-7019655.

* cited by examiner

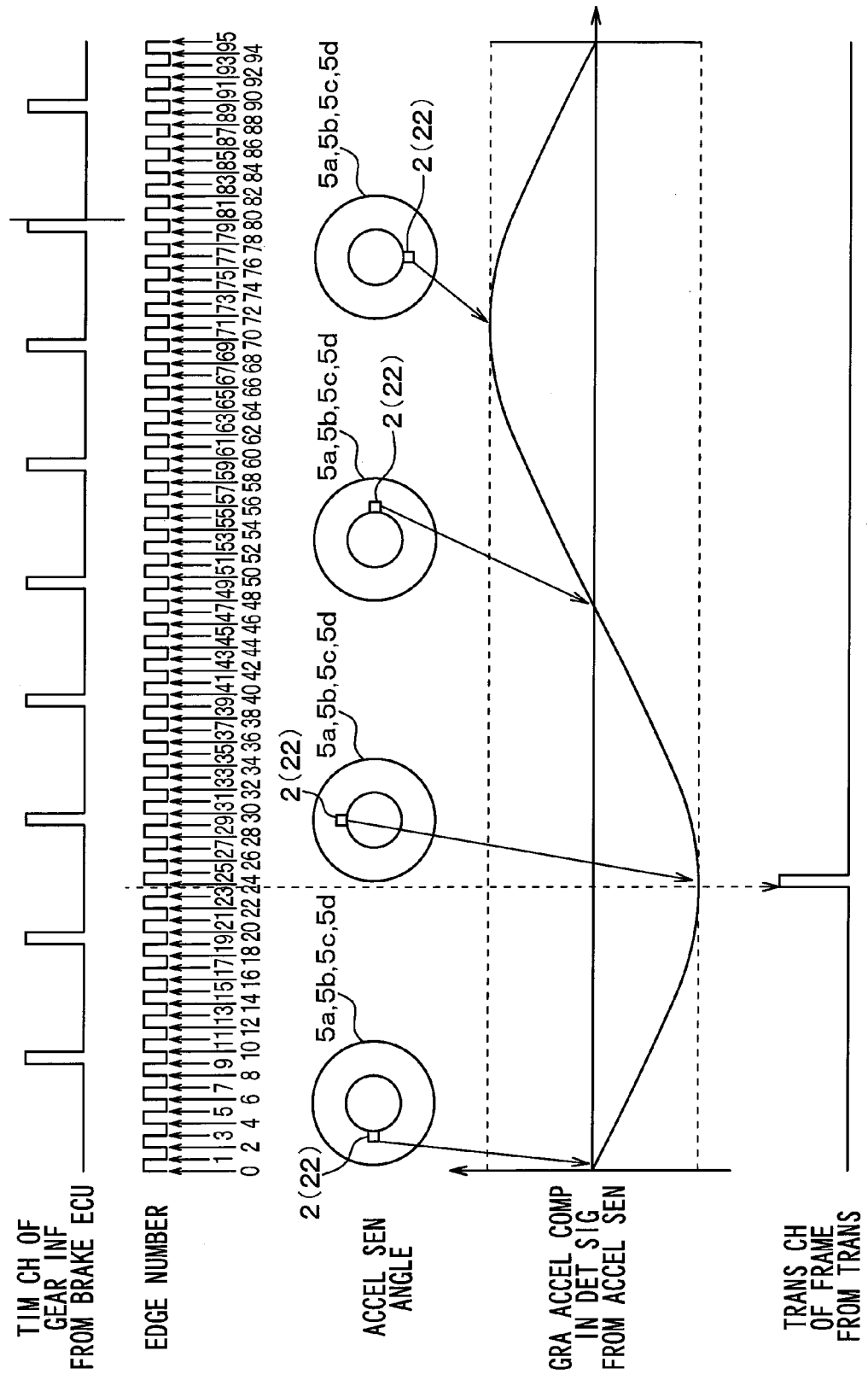

1ST REC

2ND REC

3RD REC

| REC | TIME (t) | TOOTH POS AT REC (0-95) | | | | WH POS SPE LOGIC (TRUE OR FALSE) | | | |
|---|---|---|---|---|---|---|---|---|---|
| | | FL | FR | RL | RR | FL | FR | RL | RR |
| REC 1 | 0.0 | 68 | 92 | 62 | 78 | — | — | — | — |
| REC 2 | 5.1 | 56 | 42 | 38 | 8 | TRUE | FALSE | TRUE | FALSE |
| REC 3 | 10.3 | 72 | 26 | 42 | 72 | TRUE | | TRUE | |
| REC 4 | 14.3 | 60 | 62 | 22 | 6 | TRUE | | FALSE | |

| REC | TIME (t) | TOOTH POS AT REC (0-95) | | | | WH POS SPE LOGIC (TRUE OR FALSE) | | | |
|---|---|---|---|---|---|---|---|---|---|
| | | FL | FR | RL | RR | FL | FR | RL | RR |
| REC 1 | 0.0 | 38 | 68 | 30 | 50 | — | — | — | — |
| REC 2 | 4.1 | 2 | 78 | 80 | 46 | FALSE | TRUE | FALSE | TRUE |
| REC 3 | 8.3 | 42 | 74 | 14 | 28 | | TRUE | | TRUE |
| REC 4 | 12.4 | 88 | 78 | 52 | 22 | | TRUE | | FALSE |

| REC | TIME (t) | TOOTH POS AT REC (0-95) | | | | WH POS SPE LOGIC (TRUE OR FALSE) | | | |
|---|---|---|---|---|---|---|---|---|---|
| | | FL | FR | RL | RR | FL | FR | RL | RR |
| REC 1 | 0.0 | 62 | 94 | 54 | 76 | — | — | — | — |
| REC 2 | 4.5 | 80 | 66 | 60 | 32 | TRUE | FALSE | TRUE | FALSE |
| REC 3 | 9.0 | 92 | 40 | 64 | 88 | FALSE | | TRUE | |

| REC | TIME (t) | TOOTH POS AT REC (0-95) | | | | WH POS SPE LOGIC (TRUE OR FALSE) | | | |
|---|---|---|---|---|---|---|---|---|---|
| | | FL | FR | RL | RR | FL | FR | RL | RR |
| REC 1 | 0.0 | 36 | 86 | 24 | 62 | — | — | — | — |
| REC 2 | 4.5 | 0 | 6 | 74 | 64 | FALSE | TRUE | FALSE | TRUE |
| REC 3 | 8.6 | 62 | 24 | 30 | 70 | | FALSE | | TRUE |

| REC | TIME (t) | TOOTH POS AT REC (0-95) | | | | WH POS SPE LOGIC (TRUE OR FALSE) | | | |
|---|---|---|---|---|---|---|---|---|---|
| | | FL | FR | RL | RR | FL | FR | RL | RR |
| REC 1 | 0.0 | 68 | 92 | 62 | 78 | — | — | — | — |
| REC 2 | 5.1 | 56 | 42 | 38 | 8 | TRUE | FALSE | TRUE | FALSE |
| REC 3 | 10.3 | 72 | 26 | 42 | 72 | TRUE | | TRUE | |
| REC 4 | 14.3 | 60 | 62 | 22 | 6 | TRUE | | FALSE | |
| REC 5 | 18.4 | 68 | 76 | 28 | 18 | TRUE | | | |
| REC 6 | 30.8 | 64 | 72 | 12 | 90 | TRUE | | | |
| REC 7 | 34.9 | 74 | 84 | 16 | 92 | TRUE | | | |
| REC 8 | 39.0 | 70 | 78 | 6 | 78 | TRUE | | | |
| REC 9 | 43.1 | 68 | 78 | 0 | 70 | TRUE | | | |
| REC 10 | 47.2 | 56 | 66 | 78 | 50 | TRUE | | | |
| REC 11 | 51.4 | 56 | 72 | 74 | 48 | TRUE | | | |
| REC 12 | 63.7 | 68 | 12 | 64 | 50 | TRUE | | | |
| REC 13 | 67.8 | 68 | 58 | 54 | 86 | TRUE | | | |
| REC 14 | 71.9 | 50 | 60 | 30 | 84 | TRUE | | | |

THE NUMBER OF CONSECUTIVE TRUES ≥ PREDETERMINED NUMBER

| REC | TIME (t) | TOOTH POS AT REC (0-95) | | | | WH POS SPE LOGIC (TRUE OR FALSE) | | | |
|---|---|---|---|---|---|---|---|---|---|
| | | FL | FR | RL | RR | FL | FR | RL | RR |
| REC 1 | 0.7 | 38 | 68 | 30 | 50 | — | — | — | — |
| REC 2 | 4.8 | 2 | 78 | 80 | 46 | FALSE | TRUE | FALSE | TRUE |
| REC 3 | 9.0 | 42 | 74 | 14 | 28 | | TRUE | | TRUE |
| REC 4 | 13.1 | 88 | 78 | 52 | 22 | | TRUE | | FALSE |
| REC 5 | 17.1 | 62 | 72 | 24 | 14 | | TRUE | | |
| REC 6 | 21.3 | 58 | 66 | 18 | 6 | | TRUE | | |
| REC 7 | 29.5 | 54 | 64 | 4 | 82 | | TRUE | | |
| REC 8 | 33.6 | 62 | 70 | 4 | 82 | | TRUE | | |
| REC 9 | 37.7 | 52 | 62 | 86 | 62 | | TRUE | | |
| REC 10 | 41.9 | 60 | 70 | 88 | 62 | | TRUE | | |
| REC 11 | 46.0 | 68 | 78 | 92 | 66 | | TRUE | | |
| REC 12 | 50.1 | 48 | 60 | 66 | 38 | | TRUE | | |
| REC 13 | 62.6 | 52 | 80 | 50 | 26 | | TRUE | | |
| REC 14 | 66.7 | 0 | 74 | 84 | 10 | | TRUE | | |

THE NUMBER OF CONSECUTIVE TRUES ≥ PREDETERMINED NUMBER

| REC | TIME (t) | TOOTH POS AT REC (0—95) | | | | WH POS SPE LOGIC (TRUE OR FALSE) | | | |
|---|---|---|---|---|---|---|---|---|---|
| | | FL | FR | RL | RR | FL | FR | RL | RR |
| REC 1 | 0.9 | 62 | 94 | 54 | 76 | — | — | — | — |
| REC 2 | 5.4 | 80 | 66 | 60 | 32 | TRUE | FALSE | TRUE | FALSE |
| REC 3 | 9.9 | 92 | 40 | 64 | 88 | FALSE | | TRUE | |
| REC 4 | 14.1 | 10 | 10 | 68 | 50 | | | TRUE | |
| REC 5 | 18.3 | 94 | 8 | 56 | 46 | | | TRUE | |
| REC 6 | 22.5 | 2 | 12 | 58 | 46 | | | TRUE | |
| REC 7 | 30.8 | 26 | 34 | 68 | 50 | | | TRUE | |
| REC 8 | 35.0 | 44 | 52 | 68 | 60 | | | TRUE | |
| REC 9 | 39.2 | 40 | 50 | 72 | 48 | | | TRUE | |
| REC 10 | 43.4 | 36 | 46 | 62 | 38 | | | TRUE | |
| REC 11 | 47.6 | 48 | 58 | 68 | 40 | | | TRUE | |
| REC 12 | 51.8 | 48 | 64 | 64 | 40 | | | TRUE | |
| REC 13 | 64.4 | 76 | 26 | 70 | 64 | | | TRUE | |

THE NUMBER OF CONSECUTIVE TRUES ≥ PREDETERMINED NUMBER

| REC | TIME (t) | TOOTH POS AT REC (0—95) | | | | WH POS SPE LOGIC (TRUE OR FALSE) | | | |
|---|---|---|---|---|---|---|---|---|---|
| | | FL | FR | RL | RR | FL | FR | RL | RR |
| REC 1 | 2.4 | 36 | 86 | 24 | 62 | — | — | — | — |
| REC 2 | 6.8 | 0 | 6 | 74 | 64 | FALSE | TRUE | FALSE | TRUE |
| REC 3 | 11.0 | 62 | 24 | 30 | 70 | | FALSE | | TRUE |
| REC 4 | 15.1 | 12 | 18 | 70 | 58 | | | | TRUE |
| REC 5 | 19.3 | 6 | 14 | 64 | 52 | | | | TRUE |
| REC 6 | 27.7 | 34 | 42 | 82 | 66 | | | | TRUE |
| REC 7 | 31.9 | 32 | 42 | 74 | 56 | | | | TRUE |
| REC 8 | 36.1 | 46 | 56 | 84 | 60 | | | | TRUE |
| REC 9 | 40.3 | 64 | 72 | 94 | 70 | | | | TRUE |
| REC 10 | 44.5 | 62 | 72 | 86 | 62 | | | | TRUE |
| REC 11 | 48.6 | 66 | 76 | 86 | 58 | | | | TRUE |
| REC 12 | 52.8 | 56 | 80 | 72 | 52 | | | | TRUE |
| REC 13 | 61.3 | 2 | 14 | 2 | 58 | | | | TRUE |

THE NUMBER OF CONSECUTIVE TRUES ≥ PREDETERMINED NUMBER

| REC | TIME (t) | TOOTH POS AT REC (0−95) | | | | WH POS SPE LOGIC (TRUE OR FALSE) | | | |
|---|---|---|---|---|---|---|---|---|---|
| | | FL | FR | RL | RR | FL | FR | RL | RR |
| REC 1 | 0.1 | 0 | 88 | 94 | 82 | — | — | — | — |
| REC 2 | 4.1 | 0 | 76 | 88 | 60 | TRUE | TRUE | TRUE | TRUE |
| REC 3 | 8.3 | 6 | 72 | 88 | 46 | TRUE | TRUE | TRUE | FALSE |
| REC 4 | 12.6 | 94 | 74 | 76 | 36 | TRUE | TRUE | TRUE | |
| REC 5 | 17.2 | 86 | 10 | 64 | 58 | TRUE | FALSE | FALSE | |
| REC 6 | 21.3 | 40 | 56 | 62 | 0 | FALSE | | | |

THE NUMBER OF CONSECUTIVE TRUES < PREDETERMINED NUMBER

| REC | TIME (t) | TOOTH POS AT REC (0−95) | | | | WH POS SPE LOGIC (TRUE OR FALSE) | | | |
|---|---|---|---|---|---|---|---|---|---|
| | | FL | FR | RL | RR | FL | FR | RL | RR |
| REC 1 | 3.2 | 28 | 12 | 22 | 94 | — | — | — | — |
| REC 2 | 7.3 | 32 | 4 | 20 | 78 | TRUE | TRUE | TRUE | TRUE |
| REC 3 | 11.4 | 38 | 10 | 20 | 72 | TRUE | TRUE | TRUE | TRUE |
| REC 4 | 15.5 | 94 | 2 | 74 | 54 | FALSE | TRUE | FALSE | FALSE |
| REC 5 | 19.7 | 62 | 10 | 34 | 54 | | TRUE | | |
| REC 6 | 23.8 | 22 | 12 | 84 | 44 | | TRUE | | |
| REC 7 | 28.0 | 78 | 50 | 38 | 40 | | FALSE | | |

THE NUMBER OF CONSECUTIVE TRUES < PREDETERMINED NUMBER

| REC | TIME (t) | TOOTH POS AT REC (0-95) | | | | WH POS SPE LOGIC (TRUE OR FALSE) | | | |
|---|---|---|---|---|---|---|---|---|---|
| | | FL | FR | RL | RR | FL | FR | RL | RR |
| REC 1 | 0.9 | 6 | 90 | 2 | 82 | — | — | — | — |
| REC 2 | 5.1 | 30 | 8 | 20 | 86 | TRUE | TRUE | TRUE | TRUE |
| REC 3 | 9.3 | 38 | 6 | 22 | 74 | FALSE | TRUE | TRUE | TRUE |
| REC 4 | 13.6 | 30 | 16 | 12 | 74 | | TRUE | TRUE | TRUE |
| REC 5 | 23.9 | 54 | 44 | 20 | 78 | | FALSE | TRUE | TRUE |
| REC 6 | 28.1 | 58 | 92 | 18 | 20 | | | TRUE | FALSE |
| REC 7 | 40.8 | 70 | 26 | 12 | 32 | | | TRUE | |
| REC 8 | 45.0 | 0 | 54 | 32 | 50 | | | TRUE | |
| REC 9 | 49.1 | 70 | 28 | 2 | 18 | | | FALSE | |

THE NUMBER OF CONSECUTIVE TRUES < PREDETERMINED NUMBER

| REC | TIME (t) | TOOTH POS AT REC (0-95) | | | | WH POS SPE LOGIC (TRUE OR FALSE) | | | |
|---|---|---|---|---|---|---|---|---|---|
| | | FL | FR | RL | RR | FL | FR | RL | RR |
| REC 1 | 3.3 | 86 | 70 | 80 | 56 | — | — | — | — |
| REC 2 | 7.5 | 26 | 94 | 14 | 70 | FALSE | TRUE | FALSE | TRUE |
| REC 3 | 11.7 | 22 | 92 | 4 | 58 | | TRUE | | TRUE |
| REC 4 | 20.1 | 60 | 14 | 32 | 56 | | FALSE | | TRUE |
| REC 5 | 24.3 | 22 | 18 | 84 | 50 | | | | TRUE |
| REC 6 | 28.5 | 86 | 26 | 44 | 50 | | | | TRUE |
| REC 7 | 41.0 | 0 | 52 | 38 | 12 | | | | FALSE |

THE NUMBER OF CONSECUTIVE TRUES < PREDETERMINED NUMBER

| REC | TIME (t) | TOOTH POS AT REC (0-95) | | | | WH POS SPE LOGIC (TRUE OR FALSE) | | | |
|---|---|---|---|---|---|---|---|---|---|
| | | FL | FR | RL | RR | FL | FR | RL | RR |
| REC 1 | 0.0 | 68 | 92 | 62 | 78 | — | — | — | — |
| REC 2 | 5.1 | 56 | 42 | 38 | 8 | TRUE | FALSE | TRUE | FALSE |
| REC 3 | 10.3 | 72 | 26 | 42 | 72 | TRUE | / | TRUE | / |
| REC 4 | 14.3 | 60 | 62 | 22 | 6 | TRUE | / | FALSE | / |

DETERMINED AT THIS TIME

| REC | TIME (t) | TOOTH POS AT REC (0-95) | | | | WH POS SPE LOGIC (TRUE OR FALSE) | | | |
|---|---|---|---|---|---|---|---|---|---|
| | | FL | FR | RL | RR | FL | FR | RL | RR |
| REC 1 | 0.7 | 38 | 68 | 30 | 50 | — | — | — | — |
| REC 2 | 4.8 | 2 | 78 | 80 | 46 | FALSE | TRUE | FALSE | TRUE |
| REC 3 | 9.0 | 42 | 74 | 14 | 28 | / | TRUE | / | TRUE |
| REC 4 | 13.1 | 88 | 78 | 52 | 22 | / | TRUE | / | FALSE |

DETERMINED AT THIS TIME

| REC | TIME (t) | TOOTH POS AT REC (0-95) | | | | WH POS SPE LOGIC (TRUE OR FALSE) | | | |
|---|---|---|---|---|---|---|---|---|---|
| | | FL | FR | RL | RR | FL | FR | RL | RR |
| REC 1 | 0.9 | 62 | 94 | 54 | 76 | — | — | — | — |
| REC 2 | 5.4 | 80 | 66 | 60 | 32 | TRUE | FALSE | TRUE | FALSE |
| REC 3 | 9.9 | 92 | 40 | 64 | 88 | FALSE | / | TRUE | / |

DETERMINED AT THIS TIME

| REC | TIME (t) | TOOTH POS AT REC (0-95) | | | | WH POS SPE LOGIC (TRUE OR FALSE) | | | |
|---|---|---|---|---|---|---|---|---|---|
| | | FL | FR | RL | RR | FL | FR | RL | RR |
| FRAME CONTAINING ID4 IS NOT RECEIVED ||||||||||

| REC | TIME (t) | TOOTH POS AT REC (0-95) | | | | WH POS SPE LOGIC (TRUE OR FALSE) | | | |
|---|---|---|---|---|---|---|---|---|---|
| | | FL | FR | RL | RR | FL | FR | RL | RR |
| REC 1 | 4.2 | 36 | 86 | 24 | 62 | — | — | — | — |
| REC 2 | 8.6 | 0 | 6 | 74 | 64 | FALSE | TRUE | FALSE | TRUE |
| REC 3 | 12.8 | 62 | 24 | 30 | 70 |  | FALSE |  | TRUE |
| REC 4 | 16.9 | 12 | 18 | 70 | 58 |  |  |  | TRUE |
| REC 5 | 21.1 | 6 | 14 | 64 | 52 |  |  |  | TRUE |
| REC 6 | 29.5 | 34 | 42 | 82 | 66 |  |  |  | TRUE |
| REC 7 | 33.7 | 32 | 42 | 74 | 56 |  |  |  | TRUE |
| REC 8 | 37.9 | 46 | 56 | 84 | 60 |  |  |  | TRUE |
| REC 9 | 42.1 | 64 | 72 | 94 | 70 |  |  |  | TRUE |
| REC 10 | 46.3 | 62 | 72 | 86 | 62 |  |  |  | TRUE |
| REC 11 | 50.4 | 66 | 76 | 86 | 58 |  |  |  | TRUE |
| REC 12 | 54.6 | 56 | 80 | 72 | 52 |  |  |  | TRUE |
| REC 13 | 63.1 | 2 | 14 | 2 | 58 |  |  |  | TRUE |

THE NUMBER OF CONSECUTIVE TRUES ≥ PREDETERMINED NUMBER

| REC | TIME (t) | TOOTH POS AT REC (0-95) | | | | WH POS SPE LOGIC (TRUE OR FALSE) | | | |
|---|---|---|---|---|---|---|---|---|---|
| | | FL | FR | RL | RR | FL | FR | RL | RR |
| REC 1 | 0.1 | 0 | 88 | 94 | 82 | — | — | — | — |
| REC 2 | 4.1 | 0 | 76 | 88 | 60 | TRUE | TRUE | TRUE | TRUE |
| REC 3 | 8.3 | 6 | 72 | 88 | 46 | TRUE | TRUE | TRUE | FALSE |
| REC 4 | 12.6 | 94 | 74 | 76 | 36 | TRUE | TRUE | TRUE | |
| REC 5 | 17.2 | 86 | 10 | 64 | 58 | TRUE | FALSE | FALSE | |
| REC 6 | 21.3 | 40 | 56 | 62 | 0 | FALSE | | | |

THE NUMBER OF CONSECUTIVE TRUES < PREDETERMINED NUMBER

| REC | TIME (t) | TOOTH POS AT REC (0-95) | | | | WH POS SPE LOGIC (TRUE OR FALSE) | | | |
|---|---|---|---|---|---|---|---|---|---|
| | | FL | FR | RL | RR | FL | FR | RL | RR |
| REC 1 | 3.2 | 28 | 12 | 22 | 94 | — | — | — | — |
| REC 2 | 7.3 | 32 | 4 | 20 | 78 | TRUE | TRUE | TRUE | TRUE |
| REC 3 | 11.4 | 38 | 10 | 20 | 72 | TRUE | TRUE | TRUE | TRUE |
| REC 4 | 15.5 | 94 | 2 | 74 | 54 | FALSE | TRUE | FALSE | FALSE |
| REC 5 | 19.7 | 62 | 10 | 34 | 54 | | TRUE | | |
| REC 6 | 23.8 | 22 | 12 | 84 | 44 | | TRUE | | |
| REC 7 | 28.0 | 78 | 50 | 38 | 40 | | FALSE | | |

THE NUMBER OF CONSECUTIVE TRUES < PREDETERMINED NUMBER

| REC | TIME (t) | TOOTH POS AT REC (0—95) | | | | WH POS SPE LOGIC (TRUE OR FALSE) | | | |
|---|---|---|---|---|---|---|---|---|---|
| | | FL | FR | RL | RR | FL | FR | RL | RR |
| REC 1 | 0.9 | 6 | 90 | 2 | 82 | — | — | — | — |
| REC 2 | 5.1 | 30 | 8 | 20 | 86 | TRUE | TRUE | TRUE | TRUE |
| REC 3 | 9.3 | 38 | 6 | 22 | 74 | FALSE | TRUE | TRUE | TRUE |
| REC 4 | 13.6 | 30 | 16 | 12 | 74 | | FALSE | TRUE | TRUE |
| REC 5 | 23.9 | 54 | 44 | 20 | 78 | | | TRUE | TRUE |
| REC 6 | 28.1 | 58 | 92 | 18 | 20 | | | TRUE | FALSE |
| REC 7 | 40.8 | 70 | 26 | 12 | 32 | | | TRUE | |
| REC 8 | 45.0 | 0 | 54 | 32 | 50 | | | TRUE | |
| REC 9 | 49.1 | 70 | 28 | 2 | 18 | | | FALSE | |

THE NUMBER OF CONSECUTIVE TRUES < PREDETERMINED NUMBER

| REC | TIME (t) | TOOTH POS AT REC (0—95) | | | | WH POS SPE LOGIC (TRUE OR FALSE) | | | |
|---|---|---|---|---|---|---|---|---|---|
| | | FL | FR | RL | RR | FL | FR | RL | RR |
| REC 1 | 3.3 | 86 | 70 | 80 | 56 | — | — | — | — |
| REC 2 | 7.5 | 26 | 94 | 14 | 70 | FALSE | TRUE | FALSE | TRUE |
| REC 3 | 11.7 | 22 | 92 | 4 | 58 | | TRUE | | TRUE |
| REC 4 | 20.1 | 60 | 14 | 32 | 56 | | FALSE | | TRUE |
| REC 5 | 24.3 | 22 | 18 | 84 | 50 | | | | TRUE |
| REC 6 | 28.5 | 86 | 26 | 44 | 50 | | | | TRUE |
| REC 7 | 41.0 | 0 | 52 | 38 | 12 | | | | FALSE |

THE NUMBER OF CONSECUTIVE TRUES < PREDETERMINED NUMBER

WHEEL POSITION DETECTOR AND TIRE INFLATION PRESSURE DETECTOR HAVING THE SAME

CROSS REFERENCE TO RELATED APPLICATIONS

This application is a U.S. National Phase Application under 35 U.S.C. 371 of International Application No. PCT/JP2013/000119 filed on Jan. 15, 2013 and published in English as WO 2013/108609 A1 on Jul. 25, 2013. This application is based on Japanese Patent Application No. 2012-008238 filed on Jan. 18, 2012. The disclosures of all of the above applications are incorporated herein by reference.

FIELD

The present disclosure relates to a wheel position detector that automatically detects where a target tire wheel is mounted in a vehicle. The wheel position detector may be used for a direct-type tire inflation pressure detector that detects a tire inflation pressure by directly attaching a transmitter having a pressure sensor to a wheel mounted with a tire, transmitting a detection result from the pressure sensor via the transmitter, and receiving the detection result by a receiver mounted on the vehicle.

BACKGROUND

A direct-type tire inflation pressure detector has been known. This type of tire inflation pressure detector uses a transmitter that is directly attached to a tire wheel of a vehicle. The transmitter has a sensor such as a pressure sensor. An antenna and a receiver are mounted on a body of the vehicle. When the transmitter transmits data including a detection signal from the sensor, the receiver receives the data via the antenna and detects a tire inflation pressure based on the data. The direct-type tire inflation pressure detector determines whether the data is transmitted from the vehicle equipped with the direct-type tire inflation pressure detector or another vehicle. Further, the direct-type tire inflation pressure detector determines which wheel is provided with the transmitter. For this purpose, each data transmitted from the transmitter contains ID information that discriminates between the vehicle and the other vehicle and identifies a wheel to which the transmitter is attached.

In order to locate the transmitter, the receiver needs to pre-register the ID information about each transmitter in association with each wheel position. If tire rotation is performed, the receiver needs to re-register the ID information. For example, patent document 1 proposes a method of automating this registration.

Specifically, in the method according to patent document 1, it is determines whether the wheel reaches a specified rotation position based on an acceleration detection signal from an acceleration sensor included in the transmitter attached to the wheel. The vehicle also detects a rotation position of the wheel based on a wireless signal from the transmitter. The vehicle monitors a change in a relative angle between the rotation positions to specify the wheel position. This method monitors a change in the relative angle between the wheel rotation position detected by the vehicle and the wheel rotation position detected by the wheel based on a deviation in a specified number of data. The method specifies the wheel position by determining that a variation with reference to an initial value exceeds an allowable value. More specifically, the number of teeth of a gear (i.e., rotor) is obtained from a wheel speed pulse outputted from a wheel speed sensor provided for a corresponding wheel. The wheel position is specified based on a relative angle between a rotation angle indicated by the number of teeth of the gear obtained from the wheel speed pulse outputted from the wheel speed sensor and a rotation position detected based on the acceleration detection signal from the acceleration sensor included in the transmitter attached to the wheel.

However, in the method described in patent document 1, when the subject vehicle receives a wireless signal from a transmitter mounted on another vehicle before registration of the ID information of the transmitter of the subject vehicle, there is a possibility that the subject vehicle incorrectly registers the ID information of the transmitter of the other vehicle as the ID information of the transmitter of the subject vehicle. Likewise, the same problem may occur when the transmitter of the subject vehicle is replaced with a new transmitter having new ID information.

CITATION LIST

Patent Literature

[PTL 1]
JP-A-2010-122023

SUMMARY

It is an object of the present disclosure to provide a wheel position detector and a tire inflation pressure detector having a wheel position detector capable of accurately specifying a wheel position in a shorter period of time.

According to a first aspect of the present disclosure, a wheel position detector is used for a vehicle including a body and wheels mounted on the body. Each wheel is equipped with a tire. The wheel position detector includes transmitters, a receiver, and wheel speed sensors. Each transmitter is mounted on a corresponding wheel and has unique identification information. Each transmitter includes a first control section for generating and transmitting a data frame containing the unique identification information. The receiver is mounted on the body of the vehicle and includes a second control section and a reception antenna. The second control section receives the frame via the reception antenna from one of the transmitters at a time. The second control section performs wheel position detection, based on the frame, to specify one of the wheels on which the one of the plurality of transmitters is mounted. The second control section stores a relationship between the one of the wheels and the unique identification information of the one of the transmitters. Each wheel speed sensor is provided with a gear rotating with the corresponding wheel. The gear includes teeth having electrical conductivity and intermediate portions alternately arranged with the teeth along an outer periphery of the gear so that a magnetic resistance of the gear changes along the outer periphery. Each wheel speed sensor outputs a tooth detection signal indicative of a passage of each of the teeth. When the second control section receives another frame containing unique identification information of a transmitter mounted on a wheel of another vehicle during the wheel position detection, the second control section performs the wheel position detection based on the frame including the other frame. Each transmitter further includes an acceleration sensor for outputting an acceleration detection signal indicative of acceleration having a gravity acceleration component varying with a rotation of the corresponding wheel. The first control section detects an angle of the transmitter based on the gravity acceleration component of the acceleration detection signal from the acceleration sensor. The transmitter forms the angle with a central axis of the corresponding wheel and a predetermined reference zero point on a circumference of the corresponding wheel. The first control section repeatedly transmits the frame each time the angle of the transmitter reaches a transmission angle. The second control section acquires gear information indicating a tooth position of the gear based on the tooth detection signal from the wheel speed sensor when the receiver receives the frame. The second control section sets a first variation allowable range based on the tooth position. The second control section excludes a certain wheel from a candidate of the one of the wheels unless the tooth position of the gear rotating with the certain wheel falls within the first variation allowable range a predetermined number of times in a row. The second control section registers a remaining wheel as the one of the wheels.

According to a second aspect of the present disclosure, a tire inflation pressure detector includes the wheel position detector according to the first aspect. Each transmitter further includes a sensing section for outputting a pressure detection signal indicative of a tire inflation pressure of the tire of the corresponding wheel. The first control section of each transmitter processes the pressure detection signal to acquire inflation pressure information about the tire inflation pressure and generates the frame in such a manner that the frame contains the pressure inflation information. The second control section of the receiver detects the tire inflation pressure of the tire of the corresponding wheel based on the inflation pressure information contained in the frame.

BRIEF DESCRIPTION OF DRAWINGS

The above and other objects, features and advantages of the present disclosure will become more apparent from the following detailed description made with reference to the accompanying drawings. In the drawings:

FIG. 1 illustrates an overall configuration of a tire inflation pressure detector including a wheel position detector according to an embodiment;
FIG. 2A illustrates a block configuration of a transmitter and a receiver;
FIG. 2B illustrates a block configuration of a transmitter and a receiver;
[FIG. 3]
FIG. 3 is a timing chart illustrating the wheel position detection;
FIG. 4 illustrates changes of gear information;
[FIG. 6A]
FIG. 6A illustrates a result of evaluating wheel positions;
[FIG. 6B]
FIG. 6B illustrates a result of evaluating wheel positions;
[FIG. 6C]
FIG. 6C illustrates a result of evaluating wheel positions;
[FIG. 6D]
FIG. 6D illustrates a result of evaluating wheel positions;
FIG. 7 illustrates a state where a frame containing transmitter identification information is received from a transmitter of another vehicle during wheel position detection under a condition that no transmitter identification information of a subject vehicle is registered;
[FIG. 8A]
FIG. 8A illustrates a result of evaluating wheel positions in the state shown in FIG. 7;
[FIG. 8B]
FIG. 8B illustrates a result of evaluating wheel positions in the state shown in FIG. 7;
[FIG. 8C]
FIG. 8C illustrates a result of evaluating wheel positions in the state shown in FIG. 7;
[FIG. 8D]
FIG. 8D illustrates a result of evaluating wheel positions in the state shown in FIG. 7;
[FIG. 9A]
FIG. 9A illustrates a result of evaluating wheel positions in the state shown in FIG. 7;
[FIG. 9B]
FIG. 9B illustrates a result of evaluating wheel positions in the state shown in FIG. 7;
[FIG. 9C]
FIG. 9C illustrates a result of evaluating wheel positions in the state shown in FIG. 7;
[FIG. 9D]
FIG. 9D illustrates a result of evaluating wheel positions in the state shown in FIG. 7;
FIG. 10 illustrates a state where a frame containing transmitter identification information is received from a transmitter of another vehicle during wheel position detection under a condition that at least one transmitter of a subject vehicle is replaced;
[FIG. 11A]
FIG. 11A illustrates a result of evaluating wheel positions in the state shown in FIG. 10;
[FIG. 11B]
FIG. 11B illustrates a result of evaluating wheel positions in the state shown in FIG. 10;
[FIG. 11C]
FIG. 11C illustrates a result of evaluating wheel positions in the state shown in FIG. 10;
[FIG. 11D]
FIG. 11D illustrates a result of evaluating wheel positions in the state shown in FIG. 10;
[FIG. 11E]
FIG. 11E illustrates a result of evaluating wheel positions in the state shown in FIG. 10;
[FIG. 12A]
FIG. 12A illustrates a result of evaluating wheel positions in the state shown in FIG. 10;
[FIG. 12B]
FIG. 12B illustrates a result of evaluating wheel positions in the state shown in FIG. 10;
[FIG. 12C]
FIG. 12C illustrates a result of evaluating wheel positions in the state shown in FIG. 10;
and
[FIG. 12D]
FIG. 12D illustrates a result of evaluating wheel positions in the state shown in FIG. 10.

DESCRIPTION OF EMBODIMENTS

Embodiments of the present disclosure will be described below with reference to the drawings.

(Embodiment)

Figure 1:
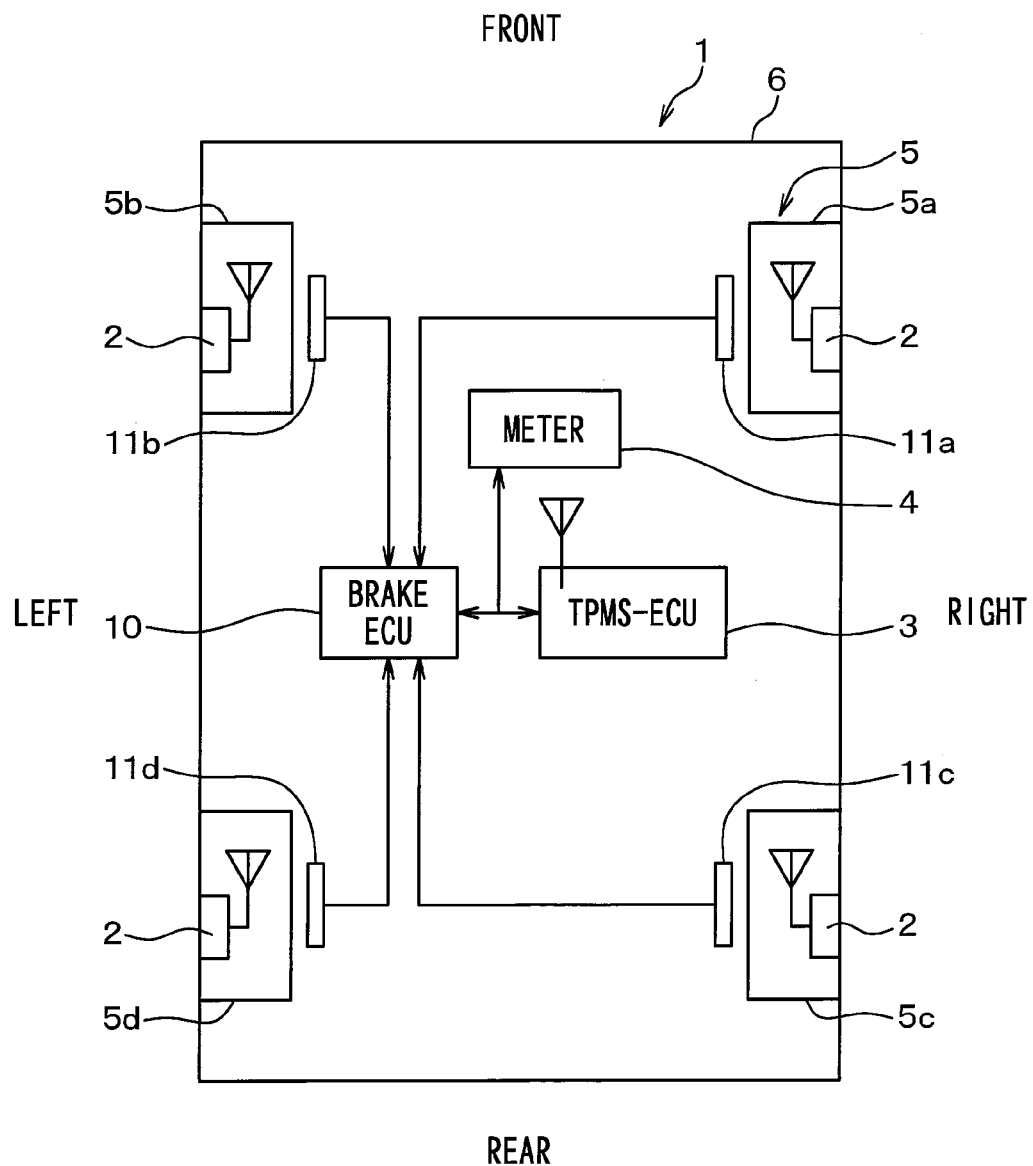
[FIG. 1]

A tire inflation pressure detector including a wheel position detector according to an embodiment of the present disclosure is described below with reference to FIG. 1. FIG. 1 illustrates an overall configuration of the tire inflation pressure detector. The top of FIG. 1 indicates the front of a vehicle 1. The bottom of FIG. 1 indicates a rear of the vehicle 1.

As illustrated in FIG. 1, the tire inflation pressure detector is attached to the vehicle 1 and includes a transmitter 2, an electronic control unit (ECU) 3 for the tire inflation pressure detector, and a meter 4. The ECU 3 functions as a receiver and is hereinafter referred to as the TPMS-ECU (Tire Pressure Monitoring System ECU) 3. To specify a wheel position, the wheel position detector uses the transmitter 2 and the TPMS-ECU 3. In addition, the wheel position detector acquires gear information from a brake control ECU (hereinafter referred to as the brake ECU) 10. The gear information is generated from detection signals of wheel speed sensors 11a-11d. The wheel speed sensors 11a-11d are respectively provided for tire wheels 5 (5a-5d).

Figure 2A:
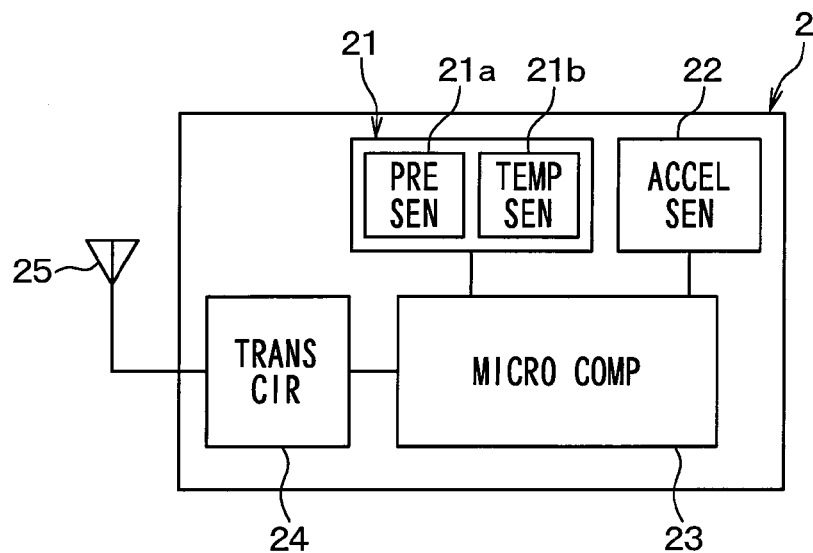
[FIG. 2A]
Figure 2B:
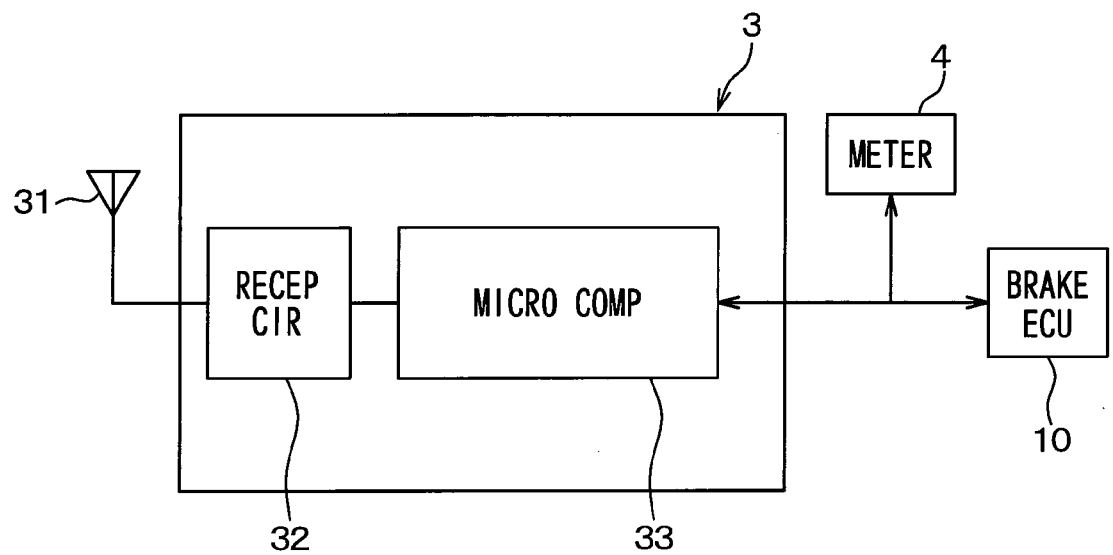
[FIG. 2B]

As illustrated in FIG. 1, the transmitter 2 is attached to each of the wheels 5a-5d. The transmitter 2 detects inflation pressures of tires mounted on the wheels 5a-5d. The transmitter 2 stores information about the tire inflation pressure as a detection result in a data frame and transmits the frame. The TPMS-ECU 3 is attached to a body 6 of the vehicle 1. The TPMS-ECU 3 receives the frame transmitted from the transmitter 2 and detects a wheel position and a tire inflation pressure by performing various processes and operations based on the detection result stored in the frame. The transmitter 2 modulates the frame according to frequency-shift keying (FSK), for example. The TPMS-ECU 3 demodulates the frame, reads the information stored in the frame, and detects the wheel position and the tire inflation pressure. FIG. 2A illustrates a block diagram of the transmitter 2, and FIG. 2B illustrates a block diagram of the TPMS-ECU 3.

As illustrated in FIG. 2A, the transmitter 2 includes a sensing section 21, an acceleration sensor 22, a microcomputer 23, a transmission circuit 24, and a transmission antenna 25. These components of the transmitter 2 are driven by power supplied from a battery (not shown).

For example, the sensing section 21 includes a diaphragm-type pressure sensor 21a and a temperature sensor 21b. The sensing section 21 outputs a detection signal indicative of the tire inflation pressure and/or a tire temperature. The acceleration sensor 22 detects a position of the sensor itself at the wheels 5a-5d where the transmitter 2 is attached. That is, the acceleration sensor 22 detects a position of the transmitter 2 and a speed of the vehicle 1. For example, according to the embodiment, the acceleration sensor 22 outputs a detection signal indicative of acceleration acting on the rotating wheels 5a-5d in the radial direction of the wheels 5a-5d, namely, in both directions perpendicular to the circumferential direction of the wheels 5a-5d.

The microcomputer 23 includes a control section (first control section) and is configured according to a known technology. The microcomputer 23 performs a predetermined process according to a program stored in an internal memory of the control section. The internal memory of the control section stores separate ID information that contains transmitter identification information to specify each transmitter 2 and vehicle identification information to specify the vehicle 1.

The microcomputer 23 receives a detection signal indicative of the tire inflation pressure from the sensing section 21, processes the signal, and modifies it as needed. Then, the microcomputer 23 stores information about the tire inflation pressure and the transmitter identification information in the frame. The microcomputer 23 monitors the detection signal from the acceleration sensor 22 to detect the speed of the vehicle 1 and to detect the position of each transmitter 2 attached to the wheels 5a-5d. When the microcomputer 23 generates the frame, the microcomputer 23 allows the transmission circuit 24 to transmit the frame to the TPMS-ECU 3 via the transmission antenna 25 based on the speed of the vehicle 1 and the position of the transmitter 2.

Specifically, the microcomputer 23 starts transmitting the frame on when the vehicle 1 is running. The microcomputer 23 repeatedly transmits the frame based on the detection signal from the acceleration sensor 22 each time an angle of the acceleration sensor 22 reaches a transmission angle. The microcomputer 23 determines whether the vehicle is running based on the speed of the vehicle 1. The microcomputer 23 determines whether the angle of the acceleration sensor 22 reaches the transmission angle based on the position of the transmitter 2.

The microcomputer 23 detects the speed of the vehicle 1 using the detection signal from the acceleration sensor 22. The microcomputer 23 determines that the vehicle is running when the speed of the vehicle 1 reaches a predetermined speed (e.g., 5 km/h) or larger. An output of the acceleration sensor 22 includes the centrifugal acceleration, namely, the acceleration based on a centrifugal force. The speed of the vehicle 1 can be calculated by integrating the centrifugal acceleration and multiplying the integral of the centrifugal acceleration by a predetermined coefficient. The microcomputer 23 calculates the centrifugal acceleration by excluding a gravity acceleration component from the output of the acceleration sensor 22 and calculates the speed of the vehicle 1 based on the centrifugal acceleration.

The acceleration sensor 22 outputs detection signals according to rotations of the wheels 5a-5d. While the vehicle 1 is running, the detection signal contains a gravity acceleration component and indicates the amplitude corresponding to the wheel rotation. For example, the detection signal indicates the maximum negative amplitude when the transmitter 2 is positioned just above a central axis of each of the wheels 5a-5d. The detection signal indicates zero amplitude when the transmitter 2 is positioned level with the central axis. The detection signal indicates the maximum positive amplitude when the transmitter 2 is positioned just below the central axis. The angle of the acceleration sensor 22, i.e., an angle of the position of the transmitter 2 can be determined based on the amplitude. For example, the angle of the acceleration sensor 22 can be determined based on the amplitude by assuming that the angle is 0 degree when the acceleration sensor 22 is positioned just above the central axis of each of the wheels 5a-5d.

Each transmitter 2 starts transmitting the frame (i.e., transmits the first frame) at the same time when the speed of the vehicle 1 reaches the predetermined speed or when the acceleration sensor 22 reaches the transmission angle after the speed of the vehicle 1 reaches the predetermined speed. The transmitter 2 repeatedly transmits the frame each time when the angle of the acceleration sensor 22 becomes the angle at which the transmitter 2 transmitted the first frame. Alternatively, the transmitter 2 can transmit the frame only once in a predetermined time period (e.g., 15 seconds) to reduce battery consumption.

The transmission circuit 24 functions as an output section for transmitting the frame, received from the microcomputer 23, to the TPMS-ECU 3 via the transmission antenna 25. For example, the frame is transmitted by using electromagnetic waves of radio frequency.

For example, the transmitter 2 is attached to an inflation valve on each of the wheels 5a-5d in such a manner that the sensing section 21 can be exposed to an inside of the tire, for example. The transmitter 2 detects the tire inflation pressure of a corresponding tire. As described above, when the speed of the vehicle 1 exceeds the predetermined speed, each transmitter 2 repeatedly transmits the frame via the transmission antenna 25 each time the acceleration sensor 22 reaches the transmission angle. The transmitter 2 may always transmit the frame each time the acceleration sensor 22 reaches the transmission. It is desirable to elongate the frame transmission interval to reduce battery consumption. To this end, the transmitter 2 can change from a wheel-positioning mode to a periodic transmission mode when the time required to determine the wheel position elapsed. In this case, in the wheel-positioning mode, the transmitter 2 transmits the frame each time the acceleration sensor 22 reaches transmission angle. In contrast, in the periodic transmission mode, the transmitter 2 transmits the frame at a longer interval (e.g., every one minute), thereby periodically transmitting a signal concerning the tire inflation pressure to the TPMS-ECU 3. For example, a random delay may be provided for each transmitter 2 so that each transmitter 2 can transmit the frame at a different timing. In such an approach, interference of radio waves from the transmitters 2 is prevented so that the TPMS-ECU 3 can surely receive the frames from the transmitters 2.

As illustrated in FIG. 2B, the TPMS-ECU 3 includes a reception antenna 31, a reception circuit 32, and a microcomputer 33. As described later, the TPMS-ECU 3 acquires gear information from the brake ECU 10 via an in-vehicle LAN such as a control area network (CAN), thereby acquiring a tooth position indicated by the number of edges of teeth (or the number of teeth) of a gear rotating with each of the wheels 5a-5d.

The reception antenna 31 receives the frames transmitted from the transmitters 2. The reception antenna 31 is fixed to the body 6 of the vehicle 1. The reception antenna 31 may be provided as an internal antenna incorporated in the TPMS-ECU 3 or provided as an external antenna having a wiring extending from an inside to an outside of the TPMS-ECU 3.

The reception circuit 32 functions as an input section for receiving the frames from the transmitters 2 via the reception antenna 31 and for sending the received frames to the microcomputer 33.

The microcomputer 33 corresponds to a second control section and performs wheel position detection in accordance with a program stored in an internal memory of the microcomputer 33. Specifically, the microcomputer 33 performs the wheel position detection based on a relationship between the gear information acquired from the brake ECU 10 and a reception timing at which the frame is received from the transmitter 2. The microcomputer 33 acquires the gear information from the brake ECU 10 at a predetermined acquisition interval (e.g., 10 ms). The gear information is generated from the wheel speed sensors 11a-11d, which are respectively provided for the wheels 5a-5d.

The gear information indicates the tooth position of the gear rotating with the wheels 5a-5d. For example, each of the wheel speed sensors 11a-11d is configured as an electromagnetic pick-up sensor and placed to face the teeth of the gear. A detection signal outputted from the wheel speed sensors 11a-11d changes each time the tooth of the gear passes the wheel speed sensors 11a-11d. Specifically, the wheel speed sensors 11a-11d output a square-wave pulse as the detection signal each time the tooth of the gear passes the wheel speed sensors 11a-11d. Therefore, rising and falling edges of the square-wave pulse represent that the edge of the tooth of the gear passes the wheel speed sensors 11a-11d. Accordingly, the brake ECU 10 counts the number of the edges of the teeth of the gear passed the wheel speed sensors 11a-11d based on the number of the rising and falling edges of the detection signal from the wheel speed sensors 11a-11d. The brake ECU 10 notifies the microcomputer 33 of the count number as the gear information at the acquisition interval. Thus, the microcomputer 33 can identify when and which tooth of the gear passes the wheel speed sensors 11a-11d based on the gear information.

The count number is reset each time the gear makes one rotation. For example, assuming that the gear has 48 teeth, the edges are numbered from 0 to 95 so that 96 edges can be counted in total. When the count number reaches 95, the brake ECU 10 counts the number of the edges after resetting the count number to 0.

The brake ECU 10 can notify the microcomputer 33 of the number of the teeth passed the wheel speed sensors 11a-11d as the gear information instead of the number of the edges of the teeth passed the wheel speed sensors 11a-11d. Alternatively, the brake ECU 10 can notify the microcomputer 33 of the number of the edges or the number of the teeth that passed the wheel speed sensors 11a-11d during the last acquisition interval, and the microcomputer 33 can add the notified number to the latest count number of the edges or the teeth. In such an approach, the microcomputer 33 can count the number of the edges or the teeth at the acquisition interval. Namely, the microcomputer 33 just needs to be able to finally acquire the number of the edges or the teeth as the gear information at the acquisition interval. The brake ECU 10 resets the count number of the edges or the teeth each time the brake ECU 10 is powered off. The brake ECU 10 restarts counting at the same time when the brake ECU 10 is powered on or when the speed of the vehicle 1 reaches the predetermined speed after the brake ECU 10 is powered on. Therefore, the same tooth is represented by the same number of the edges or the teeth while the brake ECU 10 is powered off.

The microcomputer 33 measures the reception timing when receiving the frame transmitted from each transmitter 2. The microcomputer 33 performs the wheel position detection based on the number of gear edges or teeth which is selected from the acquired number of the edges or the teeth of the gear based on the reception timing. Thus, the microcomputer 33 can perform the wheel position detection that specifies which transmitter 2 is attached to which of the wheels 5a-5d. The wheel position detection will be described in detail later.

Based on a result of the wheel position detection, the microcomputer 33 stores the transmitter identification information along with the position of the wheels 5a-5d to which the transmitter 2 identified by the transmitter identification information is attached. After that, the microcomputer 33 detects the tire inflation pressures of the wheels 5a-5d based on the transmitter identification information stored in the frame transmitted from each transmitter 2 and data about the tire inflation pressure. The microcomputer 33 outputs an electric signal indicative of the tire inflation pressure to the meter 4 via the in-vehicle LAN such as CAN. For example, the microcomputer 33 compares the tire inflation pressure with a predetermined threshold value Th to detect a decrease in the tire inflation pressure. When the microcomputer 33 detects the decrease in the tire inflation pressure, the microcomputer 33 outputs a pressure decrease signal indicative of the decrease in the tire inflation pressure to the meter 4. Thus, the meter 4 is notified of which of the four wheels 5a-5d decreases the tire inflation pressure.

The meter 4 functions as an alarm section. As illustrated in FIG. 1, the meter 4 is located at a position where a driver can view the meter 4. For example, the meter 4 is configured as a meter display included in an instrument panel of the vehicle 1. When receiving the pressure decrease signal from the microcomputer 33 of the TPMS-ECU 3, the meter 4 provides an indication representing which of the wheels 5a-5d is subjected to a decrease in the tire inflation pressure. The meter 4 thereby notifies the driver of a decrease in the tire inflation pressure on a specific wheel.

The following describes operations of the tire inflation pressure detector according to the embodiment. The description below is divided into the wheel position detection and tire inflation pressure detection performed by the tire inflation pressure detector.

Figure 4:
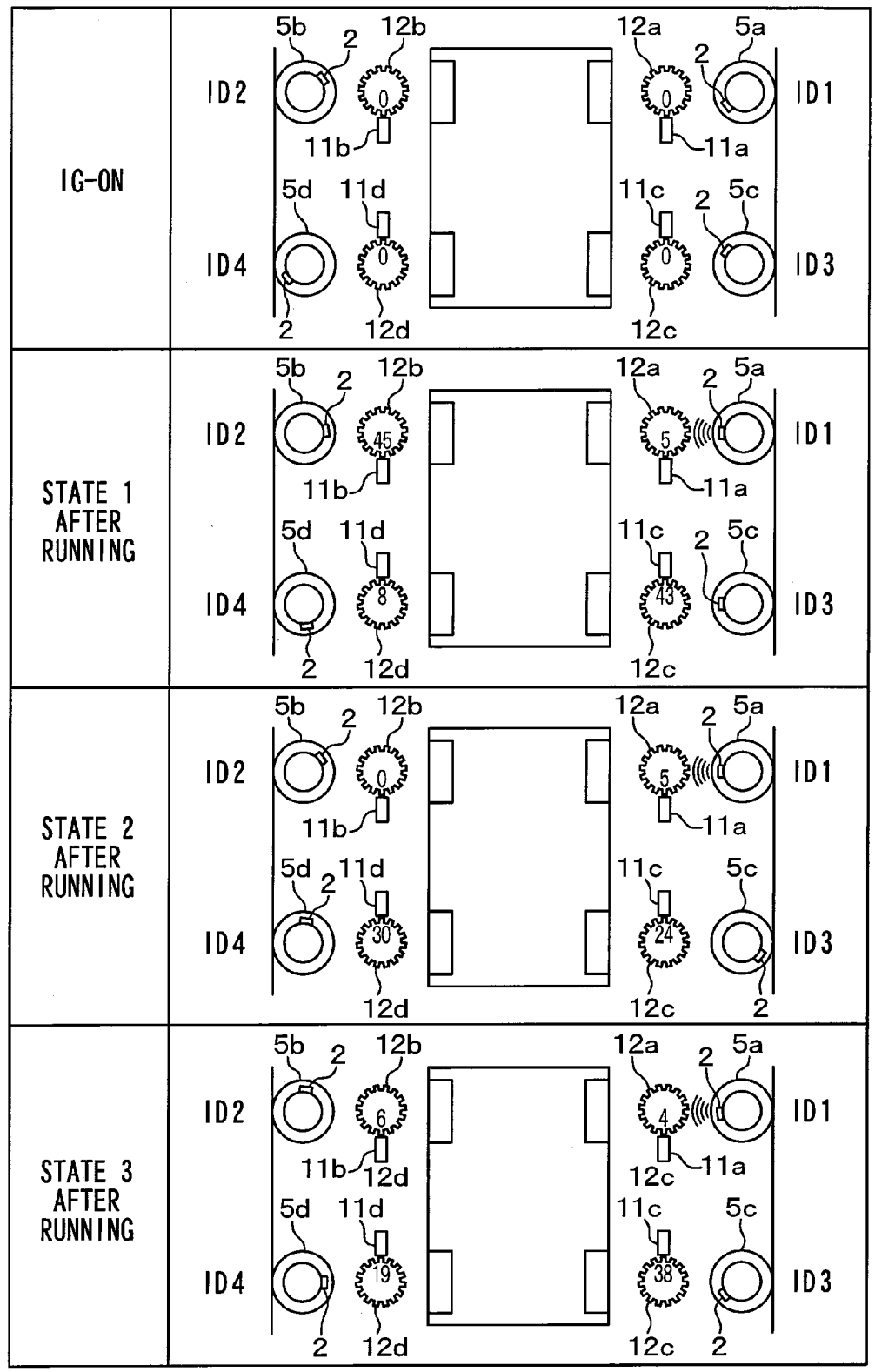
[FIG. 4]
Figure 5A:
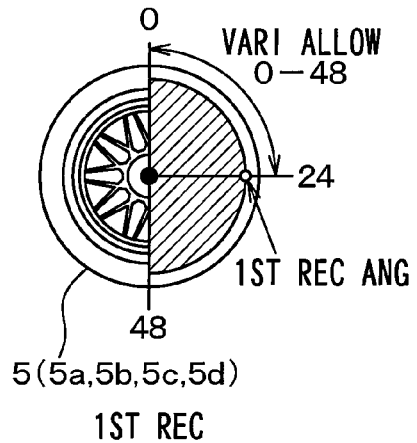
[FIG. 5A]
FIG. 5A schematically illustrates the logic to determine a wheel position.
Figure 5B:
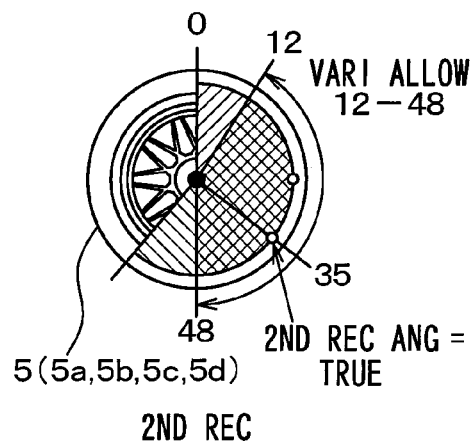
[FIG. 5B]
FIG. 5B schematically illustrates the logic to determine a wheel position.
Figure 5C:
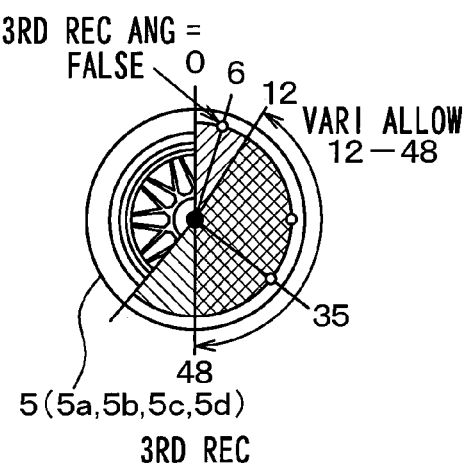
[FIG. 5C]
FIG. 5C schematically illustrates the logic to determine a wheel position.

Firstly, the wheel position detection is described. FIG. 3 is a timing chart illustrating the wheel position detection. FIG. 4 illustrates changes in the gear information. FIGS. 5A, 5B, and 5C schematically illustrate a logic (i.e., principle) to detect the wheel position. FIGS. 6A, 6B, 6C, and 6D illustrate results of evaluating the wheel positions. With reference to these drawings, a method of performing the wheel position detection will be described.

On the transmitter 2, the microcomputer 23 monitors the detection signal from the acceleration sensor 22 at a predetermined sampling interval based on the power supplied from the battery. The microcomputer 23 thereby detects the speed of the vehicle 1 and the angle of the acceleration sensor 22 on each of the wheels 5a-5d. When the speed of the vehicle 1 reaches the predetermined speed, the microcomputer 23 repeatedly transmits the frame each time the acceleration sensor 22 reaches the transmission angle. For example, the transmission angle can be an angle of the acceleration sensor 22 immediately after the vehicle speed reaches the predetermined speed. Alternatively, the transmission angle can be a predetermined angle. Thus, the microcomputer 23 repeatedly transmits the frame each time the angle of the acceleration sensor 22 becomes equal to the angle at which the first frame was transmitted.

FIG. 3 shows, from the top to the bottom, a timing to acquire the gear information from the brake ECU 10, the number of gear edges, an angle of the acceleration sensor 22, a gravity acceleration component of the detection signal from the acceleration sensor 22, and a timing to transmit the frame from the transmitter 2. As illustrated in FIG. 3, the gravity acceleration component of the detection signal from the acceleration sensor 22 becomes a sine curve. The angle of the acceleration sensor 22 can be determined based on the sine curve. The frame is transmitted each time the acceleration sensor 22 reaches the same angle based on the sine curve.

The TPMS-ECU 3 acquires the gear information from the brake ECU 10 at the acquisition interval (e.g., 10 ms). The gear information is supplied from the wheel speed sensors 11a-11d respectively provided for the wheels 5a-5d. The TPMS-ECU 3 measures the reception timing when receiving the frame transmitted from each transmitter 2. The TPMS-ECU 3 acquires the number of gear edges or teeth which is selected from the acquired number of the edges or the teeth of the gear based on the reception timing.

The timing to receive the frame transmitted from each transmitter 2 does not always coincide with the interval to acquire the gear information from the brake ECU 10. For this reason, the number of gear edges or teeth indicated in the gear information acquired at the interval closest to the timing to receive the frame can be used as the number of gear edges or teeth at the timing to receive the frame. Namely, the number of gear edges or teeth indicated in the gear information acquired immediately before or after the interval to receive the frame can be used as the number of gear edges or teeth at the timing to receive the frame. The number of the edges or the teeth of the gear at the timing to receive the frame can be calculated by using the number of gear edges or teeth indicated in the gear information acquired immediately before and after the timing to receive the frame. For example, an average of the number of gear edges or teeth that is indicated in the gear information acquired immediately before and after the timing to receive the frame can be used as the number of gear edges or teeth at the timing to receive the frame.

The tire inflation pressure detector repeats the operation to acquire the number of gear edges or teeth at the timing to receive the frame each time the frame is received. The tire inflation pressure detector performs the wheel position detection based on the number of gear edges or teeth acquired at the timing to receive the frame. Specifically, the tire inflation pressure detector performs the wheel position detection by determining whether a variation in the number of gear edges or teeth at the present timing to receive the frame falls within a variation allowable range that is set based on the number of gear edges or teeth acquired at the previous timing.

Assuming that the frame is received from a certain transmitter 2 on any one of the wheels 5a-5d, the certain transmitter 2 transmits the frame each time the acceleration sensor 22 of the certain transmitter 2 reaches the transmission angle. The tooth position almost matches the previous one since the tooth position is indicated by the number of gear edges or teeth at the timing to receive the frame. Consequently, a variation in the number of gear edges or teeth at the timing to receive the frame is small and falls within the variation allowable range. This also applies to a case of receiving the frame from the certain transmitter 2 more than once. That is, regarding the one of wheels 5a-5d on which the certain transmitter 2 is mounted, a variation in the number of gear edges or teeth at the timing to receive the frame falls within the variation allowable range that is set at the first frame reception timing at which the first frame is received from the certain transmitter 2. In contrast, regarding the others of the wheels 5a-5d, the tooth position varies since the frame is transmitted from the transmitter 2 on the others of wheels 5a-5d at timings different from the timing at which the frame is transmitted from the certain transmitter 2.

Specifically, the gears of the wheel speed sensors 11a-11d rotate in conjunction with the wheels 5a-5d, respectively. Therefore, the one of wheels 5a-5d, on which the certain transmitter 2 is mounted, hardly causes a variation in the number of gear edges or teeth at the timing to receive the frame. However, the wheels 5a-5d cannot rotate in exactly the same state because rotation states of the wheels 5a-5d vary due to, for example, a road condition, a turn, and a lane change. Therefore, the others of the wheels 5a-5d cause a variation in the tooth position that is indicated by the number of gear edges or teeth at the timing to receive the frame.

As illustrated in IG-ON of FIG. 4, gears 12a-12d of the respective wheel speed sensors 11a-11d indicate edge count 0 immediately after an ignition switch (IG) of the vehicle 1 is turned ON. After the vehicle 1 starts running, the frame is successively received from a given wheel. A wheel different from the given wheel causes a variation in the tooth position indicated by the number of gear edges or teeth. The tire inflation pressure detector performs the wheel position detection by determining whether the variation falls with the variation allowable range.

A method of setting the variation allowable range is described in detail below with reference to FIGS. 5A-5C. The variation allowable range includes a first variation allowable range and a second variation allowable range. For example, as illustrated in FIG. 5A, assuming that the transmitter 2 is positioned to a first reception angle when the transmitter 2 transmits the frame for the first time, a first variation allowable range is set centered on the first reception angle. In this example, the variation allowable range is set within 180 degrees (i.e., plus or minus 90 degrees) centered on the first reception angle, namely, within plus or minus 24 edges centered on the number of edges at the first frame reception or within plus or minus 12 teeth centered on the number of teeth at the first frame reception.

Then, when the frame is received from the transmitter 2 for the second time, the first variation allowable range is set centered on a second reception angle, which is an angle of the transmitter 2 at the second frame reception. Specifically, the first variation allowable range is set within 180 degrees (plus or minus 90 degrees) centered on the second reception angle. Further, a second variation allowable range is set based on the previously set first variation allowable range, which is within 180 degrees (i.e., plus or minus 90 degrees) centered on the first reception angle, and the presently set first variation allowable range, which is within 180 degrees (i.e., plus or minus 90 degrees) centered on the second reception angle. Specifically, the second variation allowable range is set as an overlapping range between the previously set first variation allowable range and the presently set first variation allowable range. In this example, as shown in FIG. 5B, the second variation allowable range is from edge count 12 to edge count 48. In this way, the second variation allowable range can be limited to the overlapping range between the previously set first variation allowable range and the presently set first variation allowable range. If the number of gear edges or teeth at the second frame reception falls within the second variation allowable range set at the second frame reception, i.e., within the first variation allowable range set at the first frame reception, the wheel corresponding to the number of edges or teeth is likely to match the wheel used to transmit the frame and is determined as TRUE.

As illustrated in FIG. 5C, assuming that the number of gear edges or teeth at the third frame reception falls outside the second variation allowable range set at the second frame reception, i.e., outside each of the first variation allowable ranges set at the first and second frame receptions, the wheel corresponding to the number of edges or teeth is likely to differ from the wheel used to transmit the frame and is determined as FALSE. This, the number of gear edges or teeth at the third frame reception is determined as FALSE even if it falls within the first variation allowable range set at the first frame reception but falls outside the second variation allowable range set at the second frame reception. This enables to determine on which of the wheels 5a-5d the transmitter 2 that transmits the frame received by the TPMS-ECU 3 is mounted.

FIG. 6A illustrates a case to specify a target wheel on which the transmitter 2 having transmitter identification information ID1 is mounted. The TPMS-ECU 3 acquires the number of gear edges or teeth of each wheel (front left wheel FL, front right wheel FR, rear left wheel RL, and rear right wheel RR) each time the frame containing the transmitter identification information ID1 is received. The TPMS-ECU 3 stores the acquired number of gear edges or teeth for each wheel. Each time the frame is received, the TPMS-ECU 3 determines whether the acquired number of gear edges or teeth falls within the variation allowable range. The TPMS-ECU 3 excludes a certain wheel from a candidate of the target wheel when the acquired number of gear edges or teeth corresponding to the certain wheel (5a-5d) falls outside the variation allowable range. The TPMS-ECU 3 repeats this procedure each time the frame is received. Then, the TPMS-ECU 3 registers the last remaining wheel as the target wheel. In an example of FIG. 6A, the front right wheel FR, the rear right wheel RR, and the rear left wheel RL are excluded from the candidate of the target wheel in this order. The TPMS-ECU 3 registers the last remaining front left wheel FL as the target wheel on which the transmitter 2 having transmitter identification information ID1 is mounted.

FIGS. 6B, 6C, and 6D illustrate cases to specify wheels on which the transmitters 1 having transmitter identification information ID2, ID3, and ID4 are mounted, respectively. As illustrated in FIGS. 6B-6D, the TPMS-ECU 3 performs the same procedure as described above for the transmitter identification information ID1. In this manner, the tire inflation pressure detector can specify the wheel mounted with the transmitter 2 that transmitted the frame. The tire inflation pressure detector can specify all the four wheels mounted with the transmitters 2.

When the TPMS-ECU 3 receives another frame containing transmitter identification information of a transmitter mounted on a wheel of another vehicle during the wheel position detection, the TPMS-ECU 3 performs the wheel position detection based on the other frame to specify the wheel mounted with the other transmitter. Further, assuming that when at least one of the transmitters 2 of the subject vehicle 1 is replaced with a new transmitter under a condition that the transmitter identification information of all the transmitters 2 of the subject vehicle 1 have been already registered in the TPMS-ECU 3, the number of the transmitter identification information registered in the TPMS-ECU 3 becomes larger than the number of the transmitter identification information contained in the received frames. In this case, when the TPMS-ECU 3 receives another frame containing transmitter identification information of a transmitter mounted on a wheel of another vehicle during the wheel position detection, the TPMS-ECU 3 performs the wheel position detection based on the other frame to specify the wheel mounted with the other transmitter. To prevent such a disadvantage, according to the embodiment, after the last remaining wheel is specified, the TPMS-ECU 3 excludes the last remaining wheel from the candidate of the target wheel unless the tooth position of the gear rotating with the last remaining wheel falls within the variation allowable range a predetermined number of times in a row (i.e., the number of consecutive TRUEs is equal to or greater than a predetermined number). In other words, after the last remaining wheel is specified, the TPMS-ECU 3 registers the last remaining wheel as the target wheel only when the tooth position of the gear rotating with the last remaining wheel falls within the variation allowable range a predetermined number of times in a row. In the embodiment, the predetermined number of times is counted after the last remaining wheel is specified. Alternatively, the predetermined number of times can be counted from the start of the wheel position detection.

Figure 7:
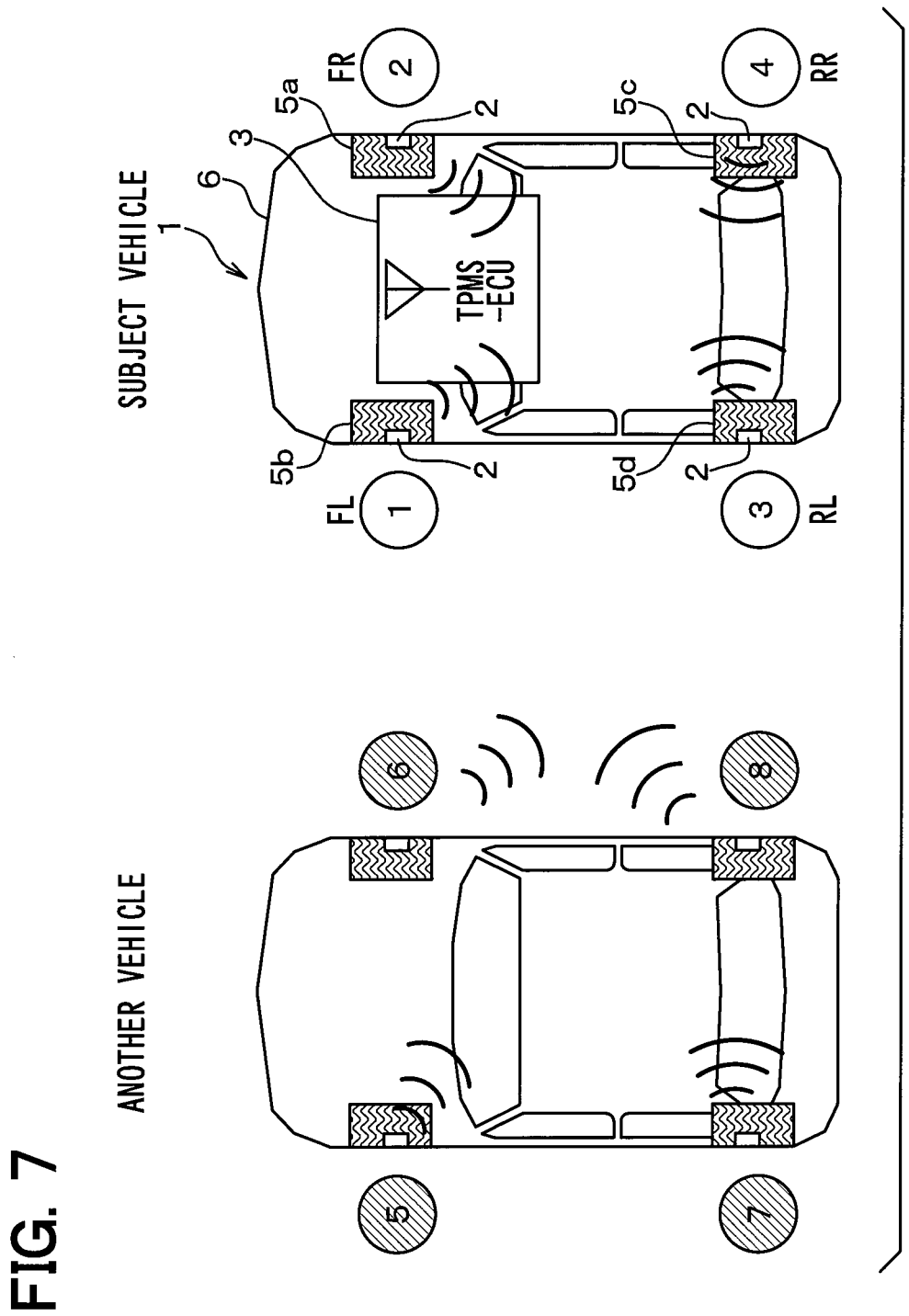
[FIG. 7]

In FIG. 7, the TPMS-ECU 3 of the subject vehicle 1 receives a frame containing transmitter identification information from a transmitter mounted on a wheel of another vehicle running side by side with the subject vehicle 1, when the wheel position detection is performed under a condition that no transmitter identification information is registered in the TPMS-ECU 3. Here, it is assumed that the transmitters 2 mounted on the wheels 5a-5d of the subject vehicle 1 have transmitter identification information ID1-ID4, respectively, and that the transmitters mounted on the wheels of the other vehicle have transmitter identification information ID5-1D8, respectively.

FIGS. 8A, 8B, 8C, 8D, 9A, 9B, 9C and 9D illustrate cases to specify the wheels on which the transmitters having the transmitter identification information ID1, ID2, ID3, ID4, ID5, ID6, ID7, and ID8 are mounted, respectively.

As shown in FIGS. 8A-8D and 9A-9D, in each case, the TPMS-ECU 3 acquires the number of gear edges or teeth of each wheel (front left wheel FL, front right wheel FR, rear left wheel RL, and rear right wheel RR) each time the frame containing the transmitter identification information is received. The TPMS-ECU 3 stores the acquired number of gear edges or teeth for each wheel. Each time the frame is received, the TPMS-ECU 3 determines whether the acquired number of gear edges or teeth falls within the variation allowable range. The TPMS-ECU 3 excludes a certain wheel from a candidate of the target wheel when the acquired number of gear edges or teeth corresponding to the certain wheel (5a-5d) falls outside the variation allowable range. The TPMS-ECU 3 repeats this procedure each time the frame is received.

Assuming that the TPMS-ECU 3 receives the frame from only the transmitters 2 mounted on the wheels 5a-5d of the subject vehicle 1, the TPMS-ECU 3 registers the last remaining wheel as the target wheel on which the transmitter 2 that transmitted the frame is mounted. However, if the TPMS-ECU 3 receives the frame from the transmitters mounted on the wheels of the other vehicle, there is a possibility that the TPMS-ECU 3 incorrectly registers the transmitter identification information of the transmitter of the other vehicle as the transmitter identification information of the transmitter 2 of the subject vehicle 1.

That is, as shown in FIGS. 9A-9D, each time the frame is received from the transmitter mounted on the wheel of the other vehicle, the TPMS-ECU 3 acquires the number of gear edges or teeth and determines whether the acquired number of gear edges or teeth falls within the variation allowable range. Then, the TPMS-ECU 3 excludes a certain wheel from a candidate of the target wheel when the acquired number of gear edges or teeth corresponding to the certain wheel (5a-5d) falls outside the variation allowable range. Then, the TPMS-ECU 3 registers the last remaining wheel as the target wheel on which the transmitter that transmitted the frame is mounted. As a result, the transmitter identification information of the transmitter mounted on the wheel of the other vehicle is incorrectly registered in the TPMS-ECU 3.

It is noted that the number of gear edges or teeth acquired at the timing to receive the frame from the other vehicle is more likely to fall outside the variation allowable range than the number of gear edges or teeth acquired at the timing to receive the frame from the subject vehicle 1. Based on this study, according to the embodiment, the transmitter identification information contained in the frame is not registered in the TPMS-ECU 3 unless the number of gear edges or teeth acquired at the timing to receive the frame falls within the variation allowable range a predetermined number of times in a row. As shown in FIGS. 8A-8D, when the frame is transmitted from the transmitters 2 mounted on the wheels 5a-5d of the subject vehicle 1, the number of gear edges or teeth acquired at the timing to receive the frame falls within the variation allowable range a predetermined number of times in a row. In contrast, when the frame is transmitted from the transmitters mounted on the wheels of the other vehicle, the number of gear edges or teeth acquired at the timing to receive the frame may fall within the variation allowable range a small number of times in a row but finally fall outside the variation allowable range. Thus, even when the TPMS-ECU 3 of the subject vehicle 1 receives the frame from the transmitter mounted on the wheel of the other vehicle under the condition that no transmitter identification information is registered in the TPMS-ECU 3, the TPMS-ECU 3 is prevented from registering the transmitter identification information of the transmitter of the other vehicle as the transmitter identification information of the transmitter 2 of the subject vehicle 1.

Figure 10:
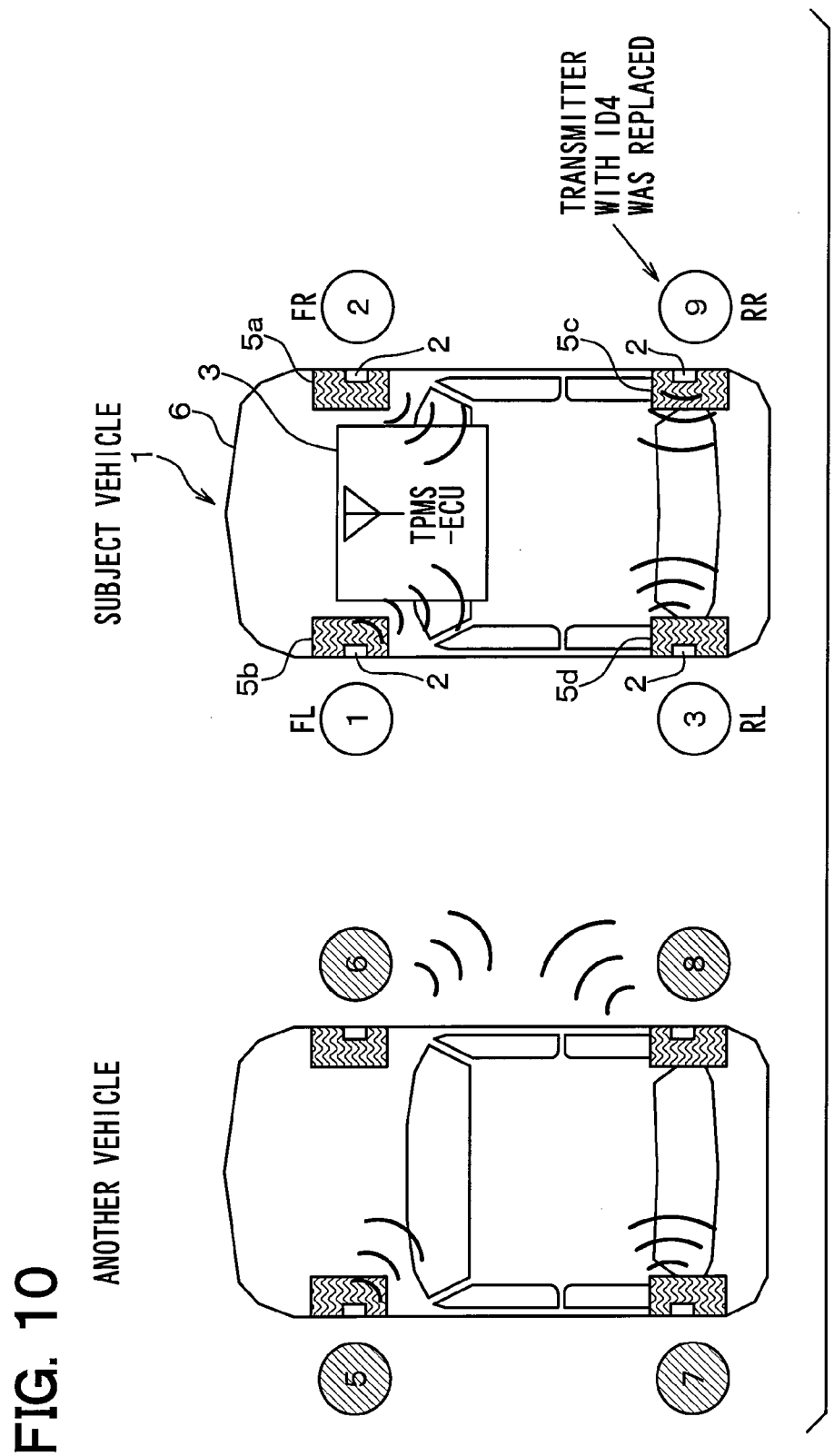
[FIG. 10]

In FIG. 10, the TPMS-ECU 3 of the subject vehicle 1 receives a frame containing transmitter identification information from a transmitter mounted on a wheel of another vehicle running side by side with the subject vehicle 1, when the wheel position detection is performed under a condition that at least one transmitter 2 mounted on the wheels 5a-5d is replaced with a new transmitter 2. Here, it is assumed that the transmitters 2 mounted on the wheels 5a-5d of the subject vehicle 1 have transmitter identification information ID1, ID2, ID9, and ID3, respectively, and that the transmitters mounted on the wheels of the other vehicle have transmitter identification information ID5-1D8, respectively. Although the transmitter 2 having transmitter identification information ID4 is replaced with the new transmitter 2 having the transmitter identification information ID9, the transmitter identification information ID1-ID4 remains registered in the TPMS-ECU 3 at this time.

FIGS. 11A, 11B, 11C, 11E, 12A, 12B, 12C and 12D illustrate cases to specify the wheels on which the transmitters having the transmitter identification information ID1, ID2, ID3, ID9, ID5, ID6, ID7, and ID8 are mounted, respectively. As a reference, FIG. 11D illustrates a case to specify the wheel on which the transmitter 2 having the transmitter identification information ID4 is mounted. As can be seen from FIG. 11D, since the transmitter 2 having the transmitter identification information ID4 was replaced, the frame is not received from the transmitter 2 having the transmitter identification information ID4.

As shown in FIGS. 11A-11C, 11E, and 12A-12D, in each case, the TPMS-ECU 3 acquires the number of gear edges or teeth of each wheel (front left wheel FL, front right wheel FR, rear left wheel RL, and rear right wheel RR) each time the frame containing the transmitter identification information is received. The TPMS-ECU 3 stores the acquired number of gear edges or teeth for each wheel. Each time the frame is received, the TPMS-ECU 3 determines whether the acquired number of gear edges or teeth falls within the variation allowable range. The TPMS-ECU 3 excludes a certain wheel from a candidate of the target wheel when the acquired number of gear edges or teeth corresponding to the certain wheel (5a-5d) falls outside the variation allowable range. The TPMS-ECU 3 repeats this procedure each time the frame is received.

Regarding the transmitter identification information ID1-ID3 that have already registered in the TPMS-ECU 3, when the wheel position is detected (i.e., when only one candidate for the target wheel remains) during the wheel position detection and the last remaining wheel matches the wheel registered in association with the transmitter identification information, it can be considered that the detected wheel position is correct. Therefore, as shown in FIGS. 11A-11C, the transmitter identification information is registered in the TPMS-ECU 3 immediately after the wheel position is detected during the wheel position detection.

In contrast, regarding the transmitter identification information ID5-1D9 that still have not registered in the TPMS-ECU 3, if the transmitter identification information is registered in the TPMS-ECU 3 immediately after the wheel position is detected (i.e., immediately after only one candidate for the target wheel remains) during the wheel position detection, there is a possibility that the TPMS-ECU 3 incorrectly registers the transmitter identification information of the transmitter of the other vehicle as the transmitter identification information of the transmitter 2 of the subject vehicle 1.

Based on this study, according to the embodiment, as shown in FIG. 11A, the transmitter identification information contained in the frame is not registered in the TPMS-ECU 3 unless the number of gear edges or teeth acquired at the timing to receive the frame falls within the variation allowable range a predetermined number of times in a row. That is, as shown in FIG. 11A, when the frame is transmitted from the transmitters 2 mounted on the wheels 5a-5d of the subject vehicle 1, the number of gear edges or teeth acquired at the timing to receive the frame falls within the variation allowable range a predetermined number of times in a row. In contrast, when the frame is transmitted from the transmitters mounted on the wheels of the other vehicle, the number of gear edges or teeth acquired at the timing to receive the frame may fall within the variation allowable range a small number of times in a row but finally fall outside the variation allowable range. Thus, even when the TPMS-ECU 3 of the subject vehicle 1 receives the frame from the transmitter mounted on the wheel of the other vehicle during the wheel position detection after at least one of the transmitters 2 mounted on the wheels 5a-5d is replaced with a new transmitter 2, the TPMS-ECU 3 is prevented from registering the transmitter identification information of the transmitter of the other vehicle as the transmitter identification information of the transmitter 2 of the subject vehicle 1.

Alternatively, regarding the transmitter identification information ID9, when the wheel position is detected (i.e., when only one candidate for the target wheel remains) during the wheel position detection, the transmitter identification information ID9 can be registered in the TPMS-ECU 3 immediately after the wheel position is detected.

In this way, which of the wheels 5a-5d the transmitter 2 that transmitted the frame is mounted on is specified. Then, the microcomputer 33 stores the transmitter identification information of the transmitter 2 that transmitted the frame in association with the position of the wheel on which the transmitter 2 is mounted.

The TPMS-ECU 3 starts to receive the frame when the speed of the subject vehicle 1 reaches the transmission angle. The TPMS-ECU 3 acquires and stores the gear information at the timing to receive the frame. The TPMS-ECU 3 erases the stored gear information when the speed of the subject vehicle 1 decreases below a threshold speed (e.g., 5 km/h) to determine whether the subject vehicle 1 stops. When the subject vehicle 1 restarts to run, the TPMS-ECU 3 performs the wheel position detection as described above to acquire and store new gear information.

After performing the wheel position detection, the tire inflation pressure detector performs the tire inflation pressure detection. Specifically, each transmitter 2 transmits the frame at a predetermined pressure detection interval during the tire inflation pressure detection. The TPMS-ECU 3 receives the frames for the four wheels 5a-5d each time the transmitter 2 transmits the frame. Based on the transmitter identification information contained in each frame, the TPMS-ECU 3 determines which of the transmitters 2 attached to the wheels 5a-5d transmitted the frame. The TPMS-ECU 3 detects the tire inflation pressures of the wheels 5a-5d based on the tire inflation pressure information contained in each frame. Thus, the TPMS-ECU 3 can detect a decrease in the tire inflation pressure of each of the wheels 5a-5d and determine which of the wheels 5a-5d is subjected to a decrease in the tire inflation pressure. The TPMS-ECU 3 notifies the meter 4 of the decrease in the tire inflation pressure. The meter 4 provides an indication representing the decrease in the tire inflation pressure while specifying any of the wheels 5a-5d. The meter 4 thereby notifies the driver of the decrease in the tire inflation pressure on a specific wheel.

As described above, according to the embodiment, the wheel position detector acquires the gear information indicating the tooth positions of the gears 12a-12d at a predetermined time interval based on detection signals from the wheel speed sensors 11a-11d that detect passage of teeth of the gears 12a-12d rotating with the wheels 5a-5d. The variation allowable range is set based on the tooth position at the timing to receive the frame. After the variation allowable range is set, a wheel may indicate the tooth position in excess of the variation allowable range at the timing to receive the frame. The wheel position detector excludes that wheel from the candidate wheels possibly mounted with the transmitter 2 that transmitted the frame. The wheel position detector registers the remaining wheel as the wheel mounted with the transmitter 2 that transmitted the frame. The wheel position detector can specify the wheel positions without using a large amount of data.

Further, according to the embodiment, when the TPMS-ECU 3 of the subject vehicle 1 receives a frame containing transmitter identification information from a transmitter mounted on a wheel of another vehicle running side by side with the subject vehicle 1, the wheel position detection is performed based on the frame. The last remaining wheel is not registered as the target wheel unless the number of gear edges or teeth of the gear rotating with the last remaining wheel acquired at the timing to receive the frame falls within the variation allowable range a predetermined number of times in a row. Specifically, when the TPMS-ECU 3 of the subject vehicle 1 receives a frame containing transmitter identification information from a transmitter mounted on a wheel of another vehicle during the wheel position detection under a condition that no transmitter identification information is registered in the TPMS-ECU 3, the transmitter identification information contained in the frame is not registered in the TPMS-ECU 3 unless the number of gear edges or teeth acquired at the timing to receive the frame falls within the variation allowable range a predetermined number of times in a row. Likewise, when the TPMS-ECU 3 of the subject vehicle 1 receives a frame containing transmitter identification information from a transmitter mounted on a wheel of another vehicle running side by side with the subject vehicle 1 during the wheel position detection under a condition that at least one transmitter 2 mounted on the wheels 5a-5d is replaced with a new transmitter 2, the transmitter identification information contained in the frame is not registered in the TPMS-ECU 3 unless the number of gear edges or teeth acquired at the timing to receive the frame falls within the variation allowable range a predetermined number of times in a row. In such an approach, the TPMS-ECU 3 is prevented from registering the transmitter identification information of the transmitter of the other vehicle as the transmitter identification information of the transmitter 2 of the subject vehicle 1.

A new variation allowable range is assumed an overlap between the variation allowable range based on the tooth position at the timing to receive the frame and the variation allowable range set at the timing to receive the previous frame. The new variation allowable range can be limited to the overlap. Therefore, the wheel position detector can fast and accurately specify wheel positions.

The frame is transmitted when the vehicle speed reaches the predetermined speed. The position of the transmitter 2 on each of the wheels 5a-5d is detected by using the acceleration sensor 22. Thus, the wheel position detector can perform the wheel position detection immediately after the subject vehicle 1 starts to run, although the wheel position detection is available only after the subject vehicle 1 starts to run. Further, the wheel position detection can be performed without a trigger device unlike conventional wheel position detection that is performed based on the intensity of a received signal outputted from the trigger device.

(Other Embodiments)

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The embodiment is based on the assumption that the TPMS-ECU 3 of the subject vehicle 1 receives all frames transmitted from transmitters mounted on the respective wheels of another vehicle. Alternatively, only when the number of the transmitter identification information contained in the frames received by the TPMS-ECU 3 is larger than the number of the wheels 5a-5d of the subject vehicle 1, it can be determined whether the tooth position of the gear rotating with the last remaining wheel falls within the variation allowable range a predetermined number of times in a row.

In the embodiment, the second variation allowable range is changed each time the frame is received in such a manner that the second variation allowable range gradually is narrowed. In contrast, the first variation allowable range, which is set centered on the tooth position, has a constant size. Alternatively, the first variation allowable range can be changed. For example, a variation in tooth positions may increase as the vehicle speed increases. Therefore, the first variation allowable range can be set more appropriately by increasing the first variation allowable range as the vehicle speed increases. Further, increasing the sampling interval for the acceleration sensor 22 to detect the acceleration degrades the timing detection accuracy when the acceleration sensor 22 reaches the transmission angle. Therefore, the first variation allowable range can be set more appropriately by changing the first variation allowable range according to the sampling interval. In this case, since the transmitter 2 keeps track of the sampling interval, the transmitter 2 can transmit the frame containing data that determines the first variation allowable range size.

In the embodiment, an angle of the acceleration sensor 22 is 0 degree when the acceleration sensor 22 is positioned just above the central axis of each of the wheels 5a-5d. However, this is just an example. The angle of the acceleration sensor 22 can be 0 degree when the acceleration sensor 22 is located at any position on the circumference of each of the wheels 5a-5d.

In the embodiment, the TPMS-ECU 3 acquires the gear information from the brake ECU 10. Alternatively, another ECU may acquire the gear information, and the TPMS-ECU 3 may acquire the gear information from the other ECU. Alternatively, a detection signal from the wheel speed sensors 11a-11d may be inputted to the TPMS-ECU 3, and the TPMS-ECU 3 may acquire the gear information from the detection signal. According to the embodiment, the TPMS-ECU 3 and the brake ECU 10 are configured as separate ECUs but may be configured as an integrated ECU. In this case, the ECU is directly supplied with a detection signal from the wheel speed sensors 11a-11d and acquires the number of gear tooth edges or teeth from the detection signal. In this case, the number of gear tooth edges or teeth can be always acquired. The wheel position detection can be performed based on the gear information just at the frame reception timing unlike the case of acquiring the information at the specified cycle.

While the embodiment has described the wheel position detector provided for the subject vehicle 1 having the four wheels 5a-5d, the disclosure is also applicable to a vehicle having more wheels.

Further, according to the embodiment, each time the TPMS-ECU 3 receives the frame, the TPMS-ECU 3 sets a first variation allowable range based on the tooth position acquired at the timing to receive the frame. Further, the TPMS-ECU 3 sets a second variation allowable range in such a manner that the second variation allowable range is an overlapping range between the previously set first variation allowable range and the presently set first variation allowable range. The wheel position detection is performed based on the second variation allowable range. In such an approach, the wheel position can be specified in a shorter period of time. Alternatively, the wheel position detection can be performed based on the first variation allowable range.

The microcomputer 23 can change the transmission angle at a predetermined time interval so that the transmission angle comprises a reference transmission angle and at least one changed transmission angle different from the reference transmission angle. In this case, the microcomputer 33 acquires the gear information indicating the tooth position when the TPMS-ECU 3 receives the frame that is transmitted by the transmitter 2 at each of the reference transmission angle and the changed transmission angle. The microcomputer 33 corrects the tooth position acquired when the TPMS-ECU 3 receives the frame transmitted at the changed transmission angle based on an angle difference between the reference transmission angle and the changed transmission angle in such a manner that the corrected tooth position corresponds to the tooth position acquired when the TPMS-ECU 3 receives the frame transmitted at the reference transmission angle. In such an approach, even if the transmitter 2 transmits the frame at the transmission angle corresponding to the Null position, where the frame transmitted from the transmitter 2 is less likely to reach the TPMS-ECU 3, the transmitter 2 can transmit the frame at the changed transmission angle next time. Thus, the frame transmitted by the transmitter 2 can be surely received by the TPMS-ECU 3 so that the wheel positions can be surely specified.

The microcomputer 23 can generate the frame in such a manner that the frame contains variation allowable range information indicative of a size of the first variation allowable range. In this case, the microcomputer 33 can set the first variation allowable range based on the variation allowable range information.

According to the disclosure, the wheel speed sensors 11a-11d just need to detect the passage of teeth of gears rotating with the wheels 5a-5d. Therefore, the gear just needs to be configured to provide different magnetic resistances by alternating a tooth having a conductive outer periphery and a portion between teeth. The gear is not limited to a general structure whose outer periphery is configured as an indented outer edge and forms a succession of conductive protrusions and non-conductive spaces. The gear includes a rotor switch whose outer periphery is configured as a conductive portion and a non-conductive insulator (see JP-A-H10-1998-048233), for example.

What is claimed is:

1. A wheel position detector for a vehicle, the vehicle including a body and a plurality of wheels mounted on the body, each wheel equipped with a tire, the wheel position detector comprising:
   a plurality of transmitters, each transmitter mounted on a corresponding wheel and having unique identification information, each transmitter including a first control section for generating and transmitting a data frame containing the unique identification information;
   a receiver mounted on the body of the vehicle and including a second control section and a reception antenna, the second control section configured to receive the frame via the reception antenna from one of the plurality of transmitters at a time, the second control section configured to perform wheel position detection, based on the frame, to specify one of the plurality of wheels on which the one of the plurality of transmitters is mounted, the second control section configured to store a relationship between the one of the plurality of wheels and the unique identification information of the one of the plurality of transmitters, and
   a plurality of wheel speed sensors, each wheel speed sensor provided with a gear rotating with the corresponding wheel, the gear including a plurality of teeth having electrical conductivity and a plurality of intermediate portions alternately arranged with the plurality of teeth along an outer periphery of the gear so that a magnetic resistance of the gear changes along the outer periphery, each wheel speed sensor configured to output a tooth detection signal indicative of a passage of each of the plurality of teeth, wherein
   when the second control section receives another frame containing unique identification information of a transmitter mounted on a wheel of another vehicle during the wheel position detection, the second control section performs the wheel position detection based on the frame including the other frame,
   each transmitter further includes an acceleration sensor configured to output an acceleration detection signal indicative of acceleration having a gravity acceleration component varying with a rotation of the corresponding wheel,
   the first control section detects an angle of the transmitter based on the gravity acceleration component of the acceleration detection signal from the acceleration sensor,
   the transmitter forms the angle with a central axis of the corresponding wheel and a predetermined reference zero point on a circumference of the corresponding wheel,
   the first control section repeatedly transmits the frame each time the angle of the transmitter reaches a transmission angle,
   the second control section acquires gear information indicating a tooth position of the gear based on the tooth detection signal from the wheel speed sensor when the receiver receives the frame,
   the second control section sets a first variation allowable range based on the tooth position,
   the second control section excludes a certain wheel from a candidate of the one of plurality of wheels unless the tooth position of the gear rotating with the certain wheel falls within the first variation allowable range a predetermined number of times in a row, and
   the second control section registers a remaining wheel as the one of plurality of wheels.

2. The wheel position detector according to claim 1, wherein
   when the remaining wheel as the candidate of the one of plurality of wheels matches the wheel registered in association with the identification information, the second control section registers the remaining wheel as the one of plurality of wheels even when the tooth position of the gear rotating with the remaining wheel does not fall within the first variation allowable range the predetermined number of times in a row.

3. The wheel position detector according to claim 1, wherein
   when the second control section receives the other frame during the wheel position detection under a condition that at least one identification information is not registered in the second control section, the second control section performs the wheel position detection based on the frame including the other frame.

4. The wheel position detector according to claim 1, wherein
   when the second control section receives the other frame during the wheel position detection under a condition that the number of the registered identification information is smaller than the number of the identification information contained in the frames received by the second control section, the second control section performs the wheel position detection based on the frame including the other frame.

5. The wheel position detector according to claim 1, wherein
   the second control section sets a second variation allowable range when the receiver receives the frame,
   the second variation allowable range is an overlapping range between the previously set first variation allowable range and the presently set first variation allowable range,
   the second control section excludes the certain wheel from the candidate of the one of plurality of wheels unless the tooth position of the gear rotating with the certain wheel falls within the second variation allowable range the predetermined number of times in a row,
   the first control section changes the transmission angle at a predetermined time interval so that the transmission angle comprises a reference transmission angle and at least one changed transmission angle different from the reference transmission angle,
   the second control section acquires the gear information indicating the tooth position when the receiver receives the frame that is transmitted by the transmitter 2 at each of the reference transmission angle and the changed transmission angle, and
   the second control section corrects the tooth position acquired when the receiver receives the frame transmitted at the changed transmission angle based on an angle difference between the reference transmission angle and the changed transmission angle in such a manner that the corrected tooth position corresponds to the tooth position acquired when the receiver receives the frame transmitted at the reference transmission angle.

6. The wheel position detector according to claim 1, wherein
   the second control section sets the first variation allowable range in such a manner that the first variation allowable range increases with an increase in a speed of the vehicle.

7. The wheel position detector according to claim 1, wherein
- the first control section generates the frame in such a manner that the frame contains variation allowable range information indicative of a size of the first variation allowable range, and
- the second control section sets the first variation allowable range based on the variation allowable range information.

8. A tire inflation pressure detector comprising:
- the wheel position detector according to claim 1, wherein
- each transmitter further includes a sensing section for outputting a pressure detection signal indicative of a tire inflation pressure of the tire of the corresponding wheel,
- the first control section of each transmitter processes the pressure detection signal to acquire inflation pressure information about the tire inflation pressure and generates the frame in such a manner that the frame contains the pressure inflation information, and
- the second control section of the receiver detects the tire inflation pressure of the tire of the corresponding wheel based on the inflation pressure information contained in the frame.

* * * * *